United States Patent
Nishidai

(10) Patent No.: US 8,971,857 B2
(45) Date of Patent: Mar. 3, 2015

(54) COMMUNICATION SYSTEM, COMMUNICATION METHOD, AND PORTABLE MACHINE

(71) Applicant: Tetsuo Nishidai, Aichi (JP)

(72) Inventor: Tetsuo Nishidai, Aichi (JP)

(73) Assignee: Omron Automotive Electronics Co., Ltd., Aichi (JP)

( * ) Notice: Subject to any disclaimer, the term of this patent is extended or adjusted under 35 U.S.C. 154(b) by 179 days.

(21) Appl. No.: 13/790,992

(22) Filed: Mar. 8, 2013

(65) Prior Publication Data

US 2013/0237189 A1 Sep. 12, 2013

(30) Foreign Application Priority Data

Mar. 8, 2012 (JP) ................................. 2012-052335

(51) Int. Cl.
*H04M 1/68* (2006.01)
*H04W 12/06* (2009.01)
(Continued)

(52) U.S. Cl.
CPC .......... *H04W 12/06* (2013.01); *H04L 63/0442* (2013.01); *H04L 63/068* (2013.01); *H04L 63/0853* (2013.01); *H04W 88/02* (2013.01); *H04L 2463/081* (2013.01)
USPC ...... 455/411; 455/345; 455/563; 340/426.17; 340/338; 710/16

(58) Field of Classification Search
USPC ............. 455/411, 345, 563; 340/426.17, 338; 710/16
See application file for complete search history.

(56) References Cited

U.S. PATENT DOCUMENTS 7,821,383 B2 10/2010 Sultan et al.
2002/0146999 A1* 10/2002 Witte .......................... 455/345
(Continued)

FOREIGN PATENT DOCUMENTS

JP 2004-088337 A 3/2004
JP 2007-046395 A 2/2007
(Continued)

OTHER PUBLICATIONS

Patent Abstracts of Japan for Japanese Publication No. 2007-046395, publication date Feb. 22, 2007 (1 page).
(Continued)

*Primary Examiner* — David Q Nguyen
(74) *Attorney, Agent, or Firm* — Osha Liang LLP

(57) ABSTRACT

A communication system includes an object communication unit provided in a controlled object, a portable machine having an identification code registered in the controlled object, the portable machine including a portable machine communication unit conducting wireless communications with the object communication unit, and a portable terminal including a portable terminal communication unit conducting wireless communications with the object communication unit and the portable machine communication unit. The controlled object includes a communication identification code generation unit generating a communication identification code at predetermined timing, the communication identification code being necessary for the portable terminal to control the controlled object, the communication identification code differing for every generation, an authentication unit authenticating a signal containing a control description which the object communication unit receives from the portable terminal communication unit; and an object control unit controlling the controlled object, based on the control description acquired from the authentication unit.

19 Claims, 15 Drawing Sheets

(51) Int. Cl.
  *H04L 29/06* (2006.01)
  *H04W 88/02* (2009.01)

(56) References Cited

U.S. PATENT DOCUMENTS

| | | | |
|---|---|---|---|
| 2007/0082706 A1* | 4/2007 | Campbell et al. | 455/563 |
| 2007/0226778 A1* | 9/2007 | Pietruszka | 726/2 |
| 2008/0231433 A1* | 9/2008 | McBride et al. | 340/426.17 |
| 2009/0240845 A1* | 9/2009 | Wiegand et al. | 710/16 |
| 2010/0198428 A1* | 8/2010 | Sultan et al. | 701/2 |
| 2011/0257817 A1* | 10/2011 | Tieman | 701/2 |
| 2012/0313768 A1* | 12/2012 | Campbell et al. | 340/438 |

FOREIGN PATENT DOCUMENTS

| | | |
|---|---|---|
| JP | 2007-085007 A | 4/2007 |
| JP | 2007-251557 A | 9/2007 |
| JP | 2009-264010 A | 11/2009 |
| JP | 4496511 B2 | 7/2010 |
| JP | 2010-168849 A | 8/2010 |

OTHER PUBLICATIONS

Patent Abstracts of Japan for Japanese Publication No. 2004-088337, publication date Mar. 18, 2004 (1 page).

Patent Abstracts of Japan for Japanese Publication No. 2007-251557, publication date Sep. 27, 2007 (1 page).

Patent Abstracts of Japan for Japanese Publication No. 2010-168849, publication date Aug. 5, 2010 (1 page).

Patent Abstracts of Japan for Japanese Publication No. 2009-264010, publication date Nov. 12, 2009 (1 page).

Patent Abstracts of Japan for Japanese Publication No. 2007-085007, publication date Apr. 5, 2007 (1 page).

* cited by examiner

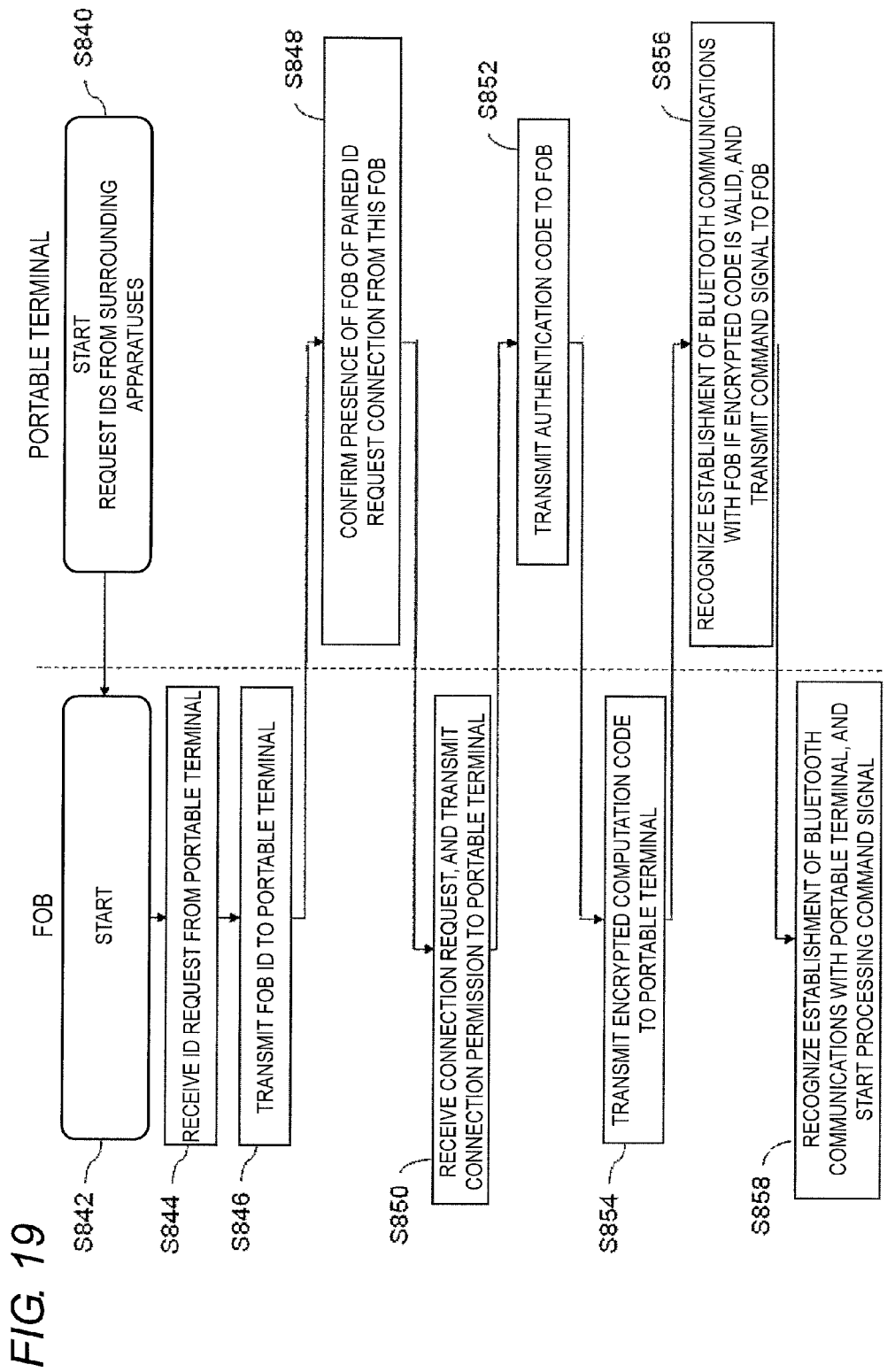

COMMUNICATION SYSTEM, COMMUNICATION METHOD, AND PORTABLE MACHINE

BACKGROUND OF THE INVENTION

1. Technical Field

The present invention relates to a communication system, a communication method, and a portable machine, and in particular to a communication system, a communication method, and a portable machine which are all related to respective three nodes of a controlled object such as a vehicle, a portable machine, and a portable terminal.

2. Related Art

Currently, systems are generally known, in which a vehicle portable machine (hereinafter, referred to as an "FOB") of a vehicle user communicates with a vehicle through radio waves. Existing portable terminals, such as portable phones or smartphones, are equipped with a function of relatively short-distance wireless communications, including Bluetooth™ and Near Field Communication (NFC). With this function, wireless communications are widely conducted among a portable terminal and a vehicle or an FOB (for example, see JP 4496511 B1).

Such a wireless communication function is also used to acquire information from a vehicle or operate the vehicle.

For example, U.S. Pat. No. 7,821,383 discloses a technique in which a portable terminal acquires various information regarding a state of a vehicle, such as a voltage drop of a battery, or someone's intrusion into the vehicle, and displays the acquired information on the screen.

JP 2007-046395 A discloses a vehicle information setting device, which conducts wireless communications with a vehicle by using a portable phone as an interface through an FOB, and displays information regarding the vehicle. In addition, the vehicle information setting device is configured to set and control on-board apparatuses (for example, opening or closing of the doors).

In the case where various pieces of information are exchanged among a portable terminal and a vehicle or an FOB as described above, the security measures such as authentication become very important.

JP 2004-088337 A discloses a keyless control method that aims to improve the convenience of a user. In this keyless control method, a portable phone downloads an identification code and the like from an ID management company's server through a public line network, and transmits a registration signal to an on-board controller in a vehicle through short-distance wireless communications. Then, if successfully identifying the identification code, the on-board controller registers a sub-ID of the portable phone, and performs a control operation of the vehicle, such as unlocking of the doors, with the sub-ID.

JP 2007-251557 A discloses an authentication processing system that aims to facilitate the registration of a portable phone with a vehicle authentication device under tight security. In this authentication processing system, first, a portable phone accesses to a vehicle management server to acquire authentication data. In turn, the vehicle detects a user's operation that indicates the start of a registration process, by which a portable phone is registered as an auxiliary key. Then, when detecting the portable phone within a coverage area of short-distance communications, the vehicle receives authentication data from the portable phone. Finally, the vehicle authenticates the portable phone, based on the authentication data.

JP 2010-168849 A discloses a key code management system for vehicles which aims to reduce a risk of leaking a key code. In this key code management system, a vehicle communicates with an authentication card to acquire an authentication card ID recorded in this authentication card. Then, the vehicle compares the acquired authentication card ID with that stored in the vehicle itself, and creates a key code when both card IDs match. In this case, the vehicle and the portable phone communicate with each other, and the portable phone stores the key code having been stored in the vehicle. After that, the vehicle determines whether or not the registration of a key code is correct, and completes the registration if this registration is correct.

JP 2009-264010 A discloses a remote control device that aims to further enhance the difficulty of decoding a transmission code containing an encrypted ID code. In this remote control device, a control circuit in a transmitter encrypts a rolling code, based on a key code unique to a vehicle. Then, the control circuit adds, to the encrypted rolling code, an additional data whose a bit length changes for every transmission, thereby generating a variable encrypted rolling code. Finally, the control circuit encrypts an ID code with the variable encrypted rolling code, thus generating a transmission code.

JP 2007-085007 A discloses a vehicle communication keylock system that aims to improve the reliability by making the falsification of a key more difficult. In this vehicle communication keylock system, encrypted data are exchanged between a main machine and a sub machine through two-way communications. Specifically, encryption methods and encrypted keys to be used differ every time the communications are conducted.

It is, however, undesirable that "keys" for authentication be exchanged through a public line, such as the Internet, from the viewpoint of security. Furthermore, because in general, a portable terminal is cheaper than a vehicle such as an automobile, there are cases that a portable terminal is frequently replaced by a new one. It is very inconvenient for a user to always bring a new portable terminal to, for example, a dealer of the vehicle and to perform the registration or deletion/re-registration processing. Moreover, when different keys are used every time the communications are conducted between, for example, a vehicle and a portable terminal as in a system using a rolling code, the relationship is not fixed between the vehicle and the FOB. Therefore, whenever buying a portable phone, a user is required to perform a necessary procedure for an application of the new portable phone. This procedure can be unsatisfactory.

SUMMARY

One or more embodiments of the present invention provide a communication system and the like, which enables highly secure communications between, for example, a portable terminal and a vehicle with simple processing and without inconveniencing a user, regardless of whether or not the user changes his/her portable terminal.

In accordance with one aspect of the present invention, there is provided, a communication system including: an object communication unit provided in a controlled object; a portable machine which has an identification code registered with the controlled object and which includes a portable machine communication unit that conducts wireless communications with the object communication unit; and a portable terminal which includes a portable terminal communication unit that conducts wireless communications with the object communication unit and the portable machine communication unit. In more detail, the controlled object further includes: a communication identification code generation unit that generates a communication identification code at predetermined timing which is necessary for the portable terminal to control the controlled object and which differs for every generation; an authentication unit that authenticates a signal containing a control description which the object communication unit receives from the portable terminal communication unit; and an object control unit that controls the controlled object, based on the control description acquired from the authentication unit. In addition, the portable machine further includes a storage unit that stores the communication identification code which the communication identification code generation unit has generated and which the portable machine has received through the object communication unit and the portable machine communication unit. The portable terminal further includes: an acquisition unit that acquires the communication identification code stored in the storage unit of the portable machine through the portable machine communication unit and the portable terminal communication unit; and an instruction unit that generates the control description for the controlled object and that transmits a signal containing the control description and the communication identification code acquired by the acquisition unit to the object communication unit from the portable terminal communication unit. When the authentication unit determines that the communication identification code contained in the signal which the object communication unit has received matches a latest communication identification code which the communication identification code generation unit has generated, the authentication unit forwards, to the object control unit, the control description contained in the signal which the object communication unit has received together with the communication identification code.

Consequently, it is possible to provide a communication system which enables highly secure communications between, for example, a portable terminal and a vehicle with simple processing and without inconveniencing a user, regardless of whether or not the user changes his/her portable terminal.

In the portable terminal, the acquisition unit may acquire the communication identification code at the time when an application for controlling the controlled object is activated.

With this function, the communication identification code can be acquired promptly and reliably, when a user attempts to control the controlled object with the portable terminal.

The communication identification code may contain timestamp information regarding a generation time of the communication identification code, and the authentication unit may determine the authentication, based on this timestamp information.

With this timestamp information, the communication identification code after a lapse of a predetermined time or longer since the generation thereof can be made invalid, thereby enhancing the security of the system.

A public key may be used as the communication identification code, and the control description may be encrypted with the public key.

With this function, the control description can be encrypted with a different public key every time, thus enhancing the security of the system.

The controlled object may be a vehicle, and the predetermined timing may be a time when a door of the vehicle is locked. In addition, at the time when the door of the vehicle is locked, the communication identification code generation unit may generate the communication identification code and transmit it to the portable machine communication unit through the object communication unit.

This function prevents the user from feeling inconvenienced by the communications between the portable terminal and the vehicle, even when a user changes his/her portable terminal. Consequently, it is possible to conduct highly secure communications with simple processing.

The communication identification code generation unit may generate the communication identification code having been generated at the predetermined timing, and transmit it to the portable machine communication unit through the object communication unit.

In many cases, a user is present near the controlled object at this predetermined timing. Therefore, by transmitting the communication identification code immediately after being generated, the possibility is reduced, in which the portable machine communication unit of the portable machine fails to receive the communication identification code.

The portable machine further may include: a portable machine control unit which controls wireless communications between the portable machine communication unit and the object communication unit and between the portable machine communication unit and the portable terminal communication unit; and a communication result detection unit which detects that the portable machine communication unit has successfully conducted wireless communications with the object communication unit. The portable terminal may transmit the control description generated by the instruction unit to the portable machine communication unit from the portable terminal communication unit. The portable machine control unit may conduct communications to transmit a signal containing the control description received by the portable machine communication unit and the identification code to the object communication unit from the portable machine communication unit. In turn, the communication result detection unit may detect a result of the communications, and transmit a message indicating that the communications have failed to the portable terminal communication unit from the portable machine communication unit when the communications fail. Upon receiving this message indicating that the communications have failed, the instruction unit of the portable terminal may transmit a signal containing the control description and the communication identification code acquired by the acquisition unit to the object communication unit through the portable terminal communication unit.

With this configuration, even when the communications fails in which the portable machine transmits the control description and the like to the controlled object, the portable terminal can transmit the same control description and the like to the controlled object, thereby ensuring the transmission of the control description from the user to the controlled object.

The wireless communications between the portable terminal communication unit and the object communication unit may be conducted through an internet connection or a telephone line.

With this configuration, an appropriate communication method of communicating between the portable terminal communication unit and the object communication unit can be utilized in accordance with the state or environment of the communication area. There are some areas which radio waves for UHF or Wi-Fi do not reach but a telephone line is available in. Accordingly, an appropriate communication method can be utilized in accordance with the state or environment of the communication area.

In accordance with another aspect of the present invention, there is provided, a portable machine to be used in the above communication system. The portable machine has an identification code registered with a controlled object, and is configured to conduct wireless communications with: a portable terminal that creates a control description and that transmits the control description and a communication identification code to the controlled object through the wireless communications; and the controlled object that executes the control description when the communication identification code received from the portable terminal matches a latest communication identification code. Moreover, the portable machine is provided, which includes a first portable machine communication unit, a storage unit, and a second portable machine communication unit. Specifically, the first portable machine communication unit receives the communication identification code from the controlled object. This communication identification code is necessary for the portable terminal to control the controlled object; is generated by the controlled object at predetermined timing; and differs for every generation. The storage unit stores the communication identification code received by the first portable machine communication unit. The second portable machine communication unit transmits the communication identification code stored in the storage unit to the portable terminal, in accordance with a request from the portable terminal.

With this configuration, a portable machine is provided, which enables highly secure communications between, for example, a portable terminal and a vehicle with simple processing and without inconveniencing a user, regardless of whether or not the user changes his/her portable terminal.

In accordance with still another aspect of the present invention, there is provided, a communication method performed among three parties including: a controlled object; a portable machine that has an identification code registered with the controlled object and that conducts wireless communications with the controlled object; and a portable terminal that conducts wireless communications with the controlled object and the portable machine. Furthermore, the communication method includes: generating, by using the controlled object, a communication identification code at predetermined timing which is necessary for the portable terminal to control the controlled object and which differs for every generation, and then transmitting the communication identification code to the portable machine; receiving, by using the portable machine, the communication identification code transmitted from the controlled object to store the communication identification code in the portable machine; requesting, from the portable terminal, the portable machine to transmit the stored communication identification code; transmitting, from the portable machine, the stored communication identification code to the portable terminal, in accordance with the request; receiving, by using the portable terminal, the communication identification code transmitted from the portable machine; transmitting, from the portable terminal, a created control description together with the received communication identification code to the controlled object; and receiving, by using the controlled object, the communication identification code and the control description transmitted from the portable terminal, to cause the controlled object to perform a control operation in accordance with the received control description when the received communication identification code matches a latest communication identification code which the controlled object has generated.

With these processes, a communication method is provided, which enables highly secure communications between, for example, a portable terminal and a vehicle with simple processing and without inconveniencing a user, regardless of whether or not the user changes his/her portable terminal.

As described above, it is possible to provide a communication system, a communication method, and a portable machine, all of which enable highly secure communications between, for example, a portable terminal and a vehicle with simple processing and without inconveniencing a user, regardless of whether or not the user changes his/her portable terminal.

BRIEF DESCRIPTION OF THE DRAWINGS

FIG. 19 is an explanatory view of a process of establishing Bluetooth communications between the portable terminal and the FOB, in the communication system according to the first or second embodiment of the present invention.

DETAILED DESCRIPTION

Hereinafter, individual embodiments of the present invention will be described, with reference to the accompanying drawings.

[First Embodiment]

Figure 1:
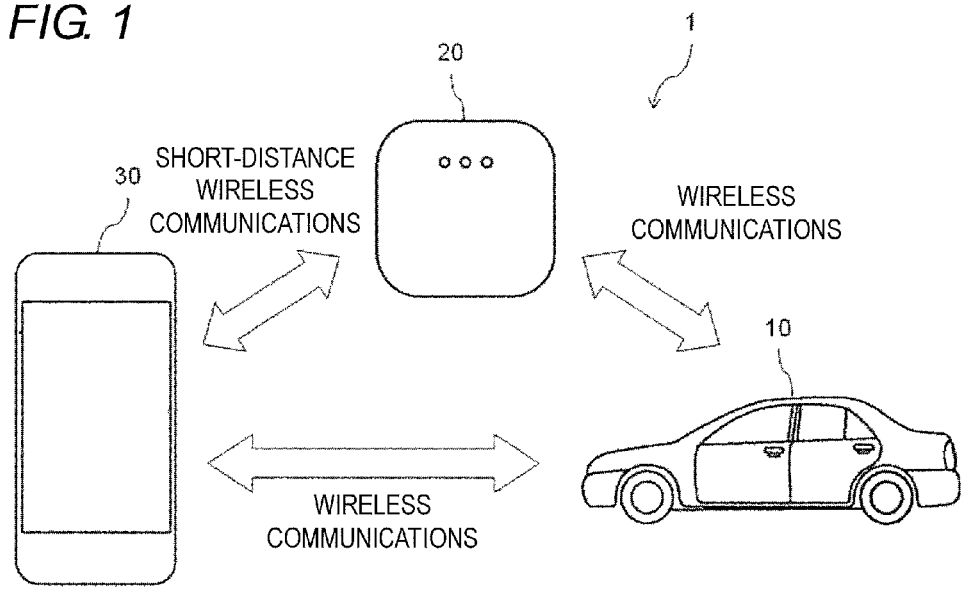
FIG. 1 is a conceptual view illustrating a communication system according to a first embodiment of the present invention.

FIG. 1 is a conceptual view illustrating a communication system 1 according to a first embodiment of the present invention. The communication system 1 includes a vehicle 10, a portable machine 20, and a portable terminal 30.

The vehicle 10 and the portable machine 20 conduct wireless communications with each other by using, for example, LF (low frequency) or UHF (ultra high frequency) radio waves, and each of them transmits/receives various instructions, information, and the like through the communications. Because the portable machine 20 functions as a key of the vehicle 10, for example, a highly secure, distinctive communication scheme is applied to communications between the vehicle 10 and the portable machine 20.

The portable machine 20 and the portable terminal 30 conduct wireless communications with each other at a short distance (approximately several centimeters to several meters), and each of them transmits/receives various commands, information, and the like through the communications. A typical communication standard, including NFC (RFID communications, etc.), infra-red communications (IrDA Data, etc.), and Bluetooth, which is adapted for, for example, a maximum communication distance or a configuration to be employed is applied to the communications between the portable machine 20 and the portable terminal 30. Because each of the portable machine 20 and the portable terminal 30 is typically held by a single user, short-distance communications are enough.

The portable terminal 30 and the vehicle 10 conduct wireless communications with each other in accordance with a typical communication standard, such as NFC, infra-red communications, Bluetooth, an internet connection (Wi-Fi, etc.), or a telephone line (W-CDMA, etc.), and each of them transmits/receives various commands, information, and the like through the communications. A communication distance between the portable terminal 30 and the vehicle 10 may be longer than that between the portable machine 20 and the vehicle 10. Therefore, a telephone line or an increasingly popularized internet connection is used for the communications therebetween, in addition to a short-distance wireless communication scheme. As a result, even when the vehicle 10 parks in an underground parking area where the UHF communications cannot be established from the portable machine 20 to the vehicle 10, the portable terminal 30 can directly communicate with the vehicle 10 through a telephone line or an internet connection.

The portable machine 20 includes a key unique to the vehicle 10, and has functions of, for example, a typically physical key of the vehicle 10, or an entry key of a passive entry system. In more detail, when a switch near a door of the vehicle 10 is operated, or when the vehicle 10 and the portable machine 20 enter a state of being able to communicate with each other, this situation triggers the portable machine 20 and the vehicle 10 to initiate an authentication process. If this authentication process is successfully completed, the doors of the vehicle 10 are locked or unlocked.

The portable machine 20 also has a function of relaying the communications between the vehicle 10 and the portable terminal 30. In more detail, the portable machine 20 can receive a command, information, or the like transmitted from the vehicle 10, and forward it to the portable terminal 30. Likewise, the portable machine 20 can receive a command, information, or the like transmitted from the portable terminal 30, and forward it to the vehicle 10.

There is no specific limitation on a type of the portable terminal 30, as long as it enables short-distance wireless communications with the portable machine 20; can acquire and display vehicle information; contains a predetermined executable application program for operating the vehicle 10 (hereinafter, referred to as "vehicle program"); and is provided with a display unit for displaying the vehicle information. Examples of the portable terminal 30 include a portable phone, a smartphone, a portable information terminal (PDA), a portable music player, and a portable game machine. In addition, examples of the "vehicle information" include a locked state of each door, a remaining battery level, an ON/OFF state of lamps, a temperature in a vehicle room, a temperature surrounding a vehicle, a location of a vehicle.

Figure 2:
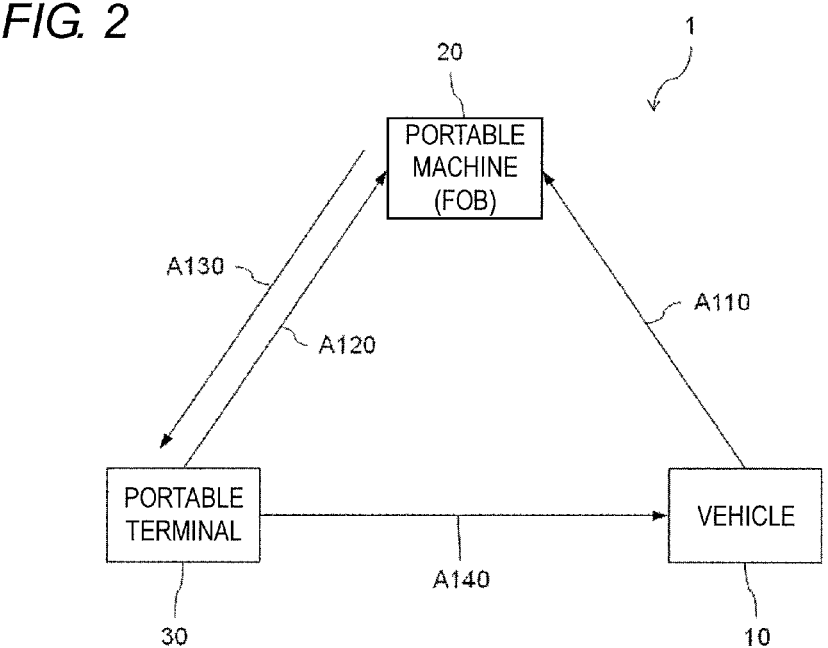
FIG. 2 is an explanatory view of an outline of communications among three nodes in the communication system according to the first embodiment of the present invention.

A description will be given of an outline of communications among respective three nodes composed of the vehicle 10, the portable machine 20, and the portable terminal 30, in the communication system 1 according to this embodiment, with reference to FIG. 2. When any given event occurs in the vehicle 10, the vehicle 10 generates a new communication identification code for the portable terminal 30. Here, the term "any given event" refers to a situation in which the vehicle 10 needs to transmit a new communication identification code.

In order to ensure highly secure communications between the portable terminal 30 and the vehicle 10, the communication identification code serving as a key with which the vehicle 10 authenticates the portable terminal 30 may be frequently updated. Meanwhile, timing when the vehicle 10 needs to transmit a new communication identification code typically corresponds to, for example, timing when the user exits out of the vehicle 10. A reason for this is that a user is expected to perform a certain operation or acquire any information when he/she leaves the vehicle 10.

However, the above timing is not limited to that when the user exits out of the vehicle 10. Alternatively, the above timing may be that when the user enters the vehicle 10, because once the user enters the vehicle 10, he/she will definitely get out of it. Thus, there is no specific limitation on the above timing, as long as the user is quite likely to be present near the vehicle 10. Herein, timing when an event occurs where the vehicle 10 needs to transmit a new communication identification code is referred to as a "predetermined timing." By generating different communication identification codes at every predetermined timing, highly secure communications are achieved between the portable terminal 30 and the vehicle 10.

For example, the vehicle 10 may recognize the following timing as timing when a user exits out of the vehicle 10, namely, the predetermined timing: the door on the side of a driver's seat is locked by a keyless operation with the portable machine 20 or pressing down a press button on a door handle, and the like; the opened door on the side of a driver's seat is closed; the user disappears on the driver's seat; the engine stops (the ignition is turned off); the engine key moves to the exterior while the engine stops; the engine key is pulled out, etc. In the following description with reference to FIG. 2, timing when a user exits out of the vehicle 10 is given as an example of the predetermined timing.

The vehicle 10 transmits a generated new communication identification code to the portable machine 20, and the portable machine 20 receives this communication identification code (A110). The portable machine 20 holds the received communication identification code by itself. While the portable machine 20 is holding the communication identification code, when short-distance wireless communications are available between the portable machine 20 and the portable terminal 30, the portable terminal 30 inquires a communication identification code of the portable machine 20, for example, at timing when a vehicle program is activated (A120).

Upon receiving the inquiry, the portable machine 20 transmits the held communication identification code to the portable terminal 30 through the short-distance wireless communications, and the portable terminal 30 receives this communication identification code (A130). The portable terminal 30 transmits, to the vehicle 10, a command signal that contains the received communication identification code and a control description for the vehicle 10, and the vehicle 10 receives this command signal (A140). When the received communication identification code matches a most recent communication identification code, the vehicle 10 performs a control operation, based on the received control description.

The portable terminal 30 inquires the communication identification code of the portable machine 20, for example, at the timing when the vehicle program is activated, and then acquires it, as described above. In this case, after transmitting the command signal or terminating the vehicle program, the portable terminal 30 discards the communication identification code, so that the communication identification code is not left therein. This function prevents the communication identification code from being reused, and eliminates the risk that someone else acquires the communication identification code, for example, when a user loses the portable terminal 30. As a result, a high level of security can be ensured. It should be noted that the portable terminal 30 may inquire a communication identification code of the portable machine 20 in response to a user's explicit operation, instead of the timing when the vehicle program is activated. Alternatively, for example, the vehicle program may reside in a memory of the portable machine 20, and inquire the communication identification code at regular intervals in a background manner. In this case, the vehicle program needs to manage the discard of the communication identification code appropriately.

Figure 3:
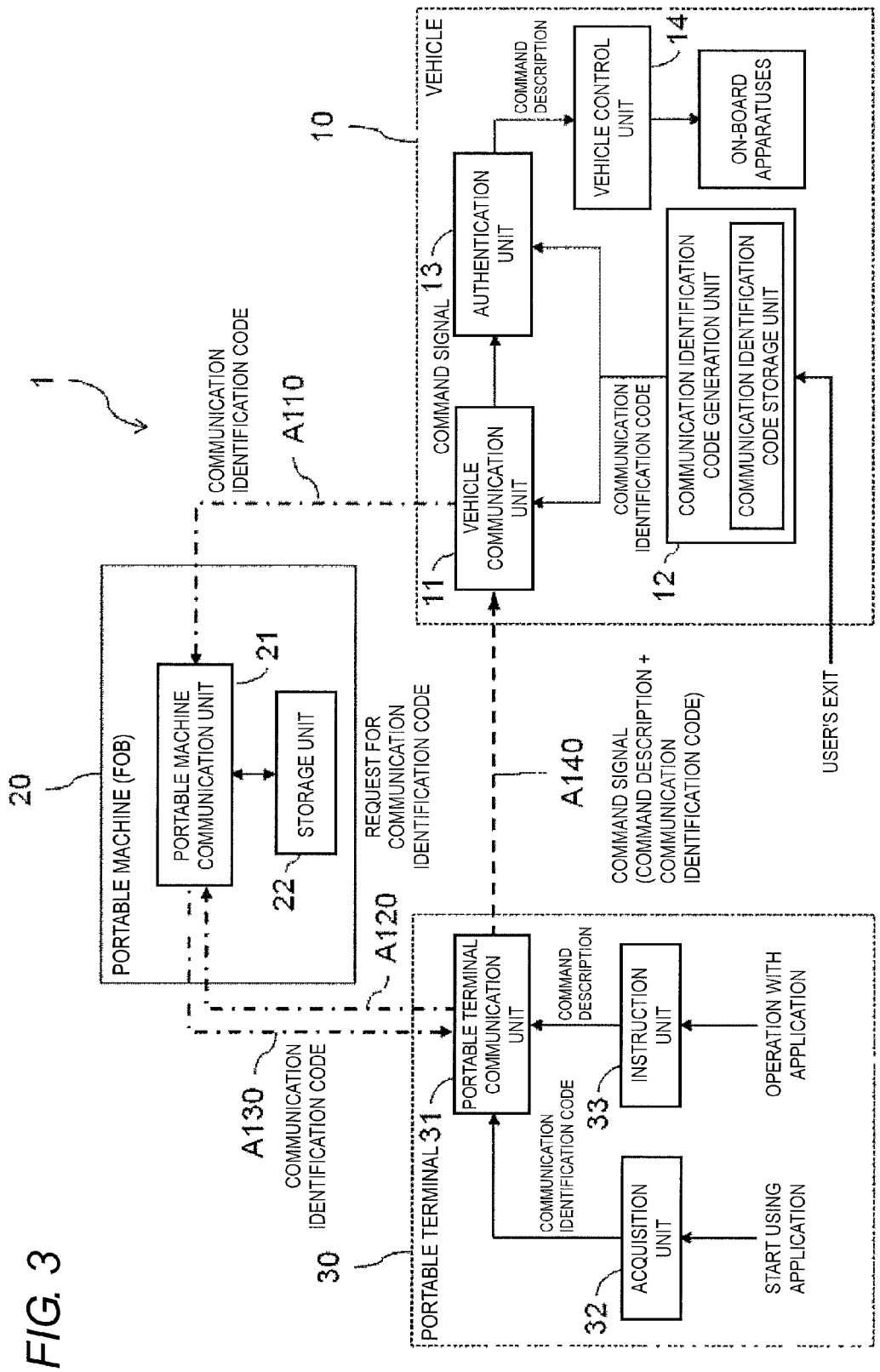
FIG. 3 is a block diagram of a functional configuration of the communication system according to the first embodiment of the present invention.

FIG. 3 depicts a functional configuration block of the communication system 1 of this embodiment. In the following description with reference to FIG. 3, timing when the user exits out of the vehicle 10 is also given as an example of the predetermined timing. The communication system 1 includes the vehicle 10, the portable machine 20, and the portable terminal 30.

The vehicle 10 includes a vehicle communication unit 11, a communication identification code generation unit 12, an authentication unit 13, and a vehicle control unit 14. Specifically, the communication identification code generation unit 12 generates a communication identification code at the predetermined timing. The communication identification code is necessary for the portable terminal 30 to control the vehicle 10, and is generated so as to differ for every generation. The authentication unit 13 authenticates a signal containing a control description which the vehicle communication unit 11 receives from the portable terminal 30. The vehicle control unit 14 controls the vehicle 10, based on a control description acquired from the authentication unit 13.

The portable machine 20 includes a portable machine communication unit 21, and a storage unit 22. Specifically, the portable machine communication unit 21 has a unique identification code registered with the vehicle 10, and conducts wireless communications with the vehicle communication unit 11. The storage unit 22 stores a communication identification code that is generated by the communication identification code generation unit 12 and that is received through the vehicle communication unit 11 and the portable machine communication unit 21.

The portable terminal 30 includes a portable terminal communication unit 31, an acquisition unit 32, and an instruction unit 33. Specifically, the portable terminal communication unit 31 conducts wireless communications with the vehicle communication unit 11 and the portable machine communication unit 21. The acquisition unit 32 acquires a communication identification code stored in the storage unit 22 of the portable machine 20 through the portable machine communication unit 21 and the portable terminal communication unit 31. The instruction unit 33 creates a control description for the vehicle 10, and transmits a command signal that contains the control description and the communication identification code acquired by the acquisition unit 32 to the vehicle communication unit 11 from the portable terminal communication unit 31.

Once the vehicle 10 detects a user's exit, the communication identification code generation unit 12 creates a communication identification code, which is necessary for the portable terminal 30 to control the vehicle 10 and which differs from those have been generated before. In order to generate a communication identification code so as to differ from those having been created before, namely, differ for every generation, for example, a unique key of the vehicle 10 and a timestamp indicating the generation date and time of the communication identification code may be merged with the communication identification code by using any suitable function (for example, a hash function). However, there is no limitation on the method of generating a communication identification code.

The communication identification code storage unit stores one or more communication identification codes generated by the communication identification code generation unit 12. The communication identification code storage unit may store only the latest communication identification code, or may store a history of a plurality of recently generated communication identification codes. It should be noted that even when the history of the recently generated communication identification codes is stored, a communication identification code to be forwarded to the vehicle communication unit 11 and the authentication unit 13 is only the most recent one.

After storing the generated communication identification code in the communication identification code storage unit, the communication identification code generation unit 12 forwards this communication identification code to the vehicle communication unit 11. The vehicle communication unit 11 transmits the communication identification code to the portable machine communication unit 21 of the portable machine 20, and the portable machine communication unit 21 receives this communication identification code (A110). After receiving the communication identification code, the portable machine communication unit 21 stores this communication identification code in the storage unit 22. In this case, only the latest communication identification code is stored in the storage unit 22.

Once a user activates a vehicle program in the portable terminal 30, the acquisition unit 32 configured by the vehicle program becomes operative. When short-distance wireless communications are available with the portable machine 20, the acquisition unit 32 transmits a request signal for a communication identification code to the portable machine 20 (the portable machine communication unit 21) through the portable terminal communication unit 31, in order to acquire the communication identification code (A120). Upon receiving the request signal for a communication identification code, the portable machine 20 extracts the communication identification code from the storage unit 22, and transmits this communication identification code to the portable terminal 30. Then, the portable terminal 30 receives the communication identification code (A130). The vehicle program temporarily saves the received communication identification code in a palliative memory area of the vehicle program.

The user instructs the control of the vehicle 10 or the acquisition of information from the vehicle 10 by operating the vehicle program in the portable terminal 30. Based on the user's instruction, the instruction unit 33 creates a control description. When wireless communications are available with the vehicle 10, the portable terminal communication unit 31 transmits, to the vehicle communication unit 11, a command signal that contains the control description and the communication identification code saved in the palliative memory area. The vehicle communication unit 11 receives this command signal (A140).

After receiving the command signal, the vehicle communication unit 11 forwards this command signal to the authentication unit 13. The communication identification code storage unit stores the communication identification code contained in the received command signal. When determining that this communication identification code matches the latest one of the communication identification codes that the communication identification code generation unit 12 has generated, the authentication unit 13 forwards, to the vehicle control unit 14, the control description contained in the command signal which the vehicle communication unit 11 has received together with the communication identification code.

With the configuration of the communication system 1 as configured above, the communication identification code that is necessary for the portable terminal 30 to control the vehicle 10 is updated frequently, for example, when the user exits out of the vehicle 10. In addition, the valid latest communication identification code is not left in the portable terminal 30 persistently. Therefore, highly secure communications are ensured between the portable terminal 30 and the vehicle 10. Consequently, it is possible to conduct highly secure communications between, for example, a portable terminal and a vehicle with simple processing and without inconveniencing a user, regardless of whether or not the user changes his/her portable terminal.

There are techniques of changing (counting up) a rolling code, and updating a key every time transmissions are conducted. Such techniques require a pre-condition that a portable machine is related one to one to a vehicle. In contrast, in one or more embodiments of the present invention, there are respective three parties of a portable terminal, a portable machine, and a vehicle. Here, the portable terminal is not related to the vehicle in advance, and the portable terminal may be changed frequently. The above techniques essentially involve disadvantageous processing by which initial setting of, for example, relating a portable machine to a vehicle, and when a portable terminal is replaced by a new one, a vehicle program in the old portable terminal needs to be transferred to the new one. In contrast, one or more embodiments of the present invention do not involve initial setting of a portable terminal and the transfer of a vehicle program when a portable terminal is replaced by a new one. As a result, the highly secure communications are achieved therebetween with simple processing.

A detailed description will be given of a process performed by the communication system 1 with reference to FIGS. 4 to 8. In the following description, a term "step" is referred to as "S" for the sake of simplicity.

Figure 4:
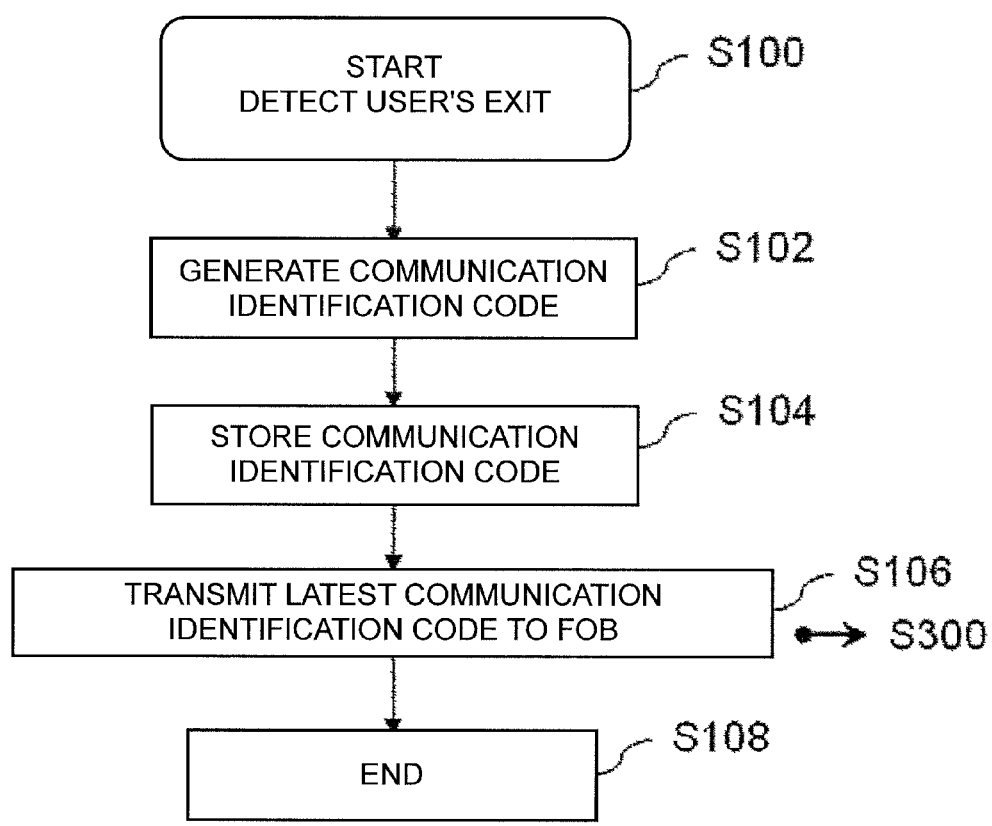
FIG. 4 is a flowchart of a process performed by the vehicle when a user exits out of a vehicle, in the communication system according to the first embodiment of the present invention.

Referring to FIG. 4, first, the vehicle 10 detects a user's exit at S100. As described above, timing of the user's exit is an example of timing when the vehicle 10 generates a communication identification code, namely, the predetermined timing. The timing of the user's exit, which is the predetermined timing, may correspond to timing when a door of the vehicle 10 is locked. This is because the user is quite likely to be present near the vehicle 10 at such timing. Therefore, by transmitting the communication identification code immediately after the generation, the possibility is reduced in which the portable machine communication unit 21 of the portable machine 20 fails to receive the communication identification code. For example, a sensor for sensing a user's exit is provided, and transmits a sensed result to the communication identification code generation unit 12.

At S102, upon receiving the result of sensing the user's exit, the communication identification code generation unit 12 generates a communication identification code. In this case, the generated communication identification code differs for every generation. In addition, the communication identification code generation unit 12 may add timestamp information regarding a generation time of the communication identification code to the communication identification code. With this timestamp information, the communication identification code after a lapse of a predetermined time or longer since the generation thereof can be made invalid, thereby enhancing the security.

At S104, the communication identification code storage unit stores the communication identification code generated by the communication identification code generation unit 12, in order to compare this communication identification code with a communication identification code that would be transmitted from the portable terminal 30 in the future.

At S106, the communication identification code is forwarded to the vehicle communication unit 11, and the vehicle communication unit 11 transmits, to the portable machine 20, the latest communication identification code that has been just generated, through wireless communications using LF or UHF radio waves. Accordingly, every time the user exits out of the vehicle 10, a different communication identification code is transmitted to the portable machine 20.

Figure 7:
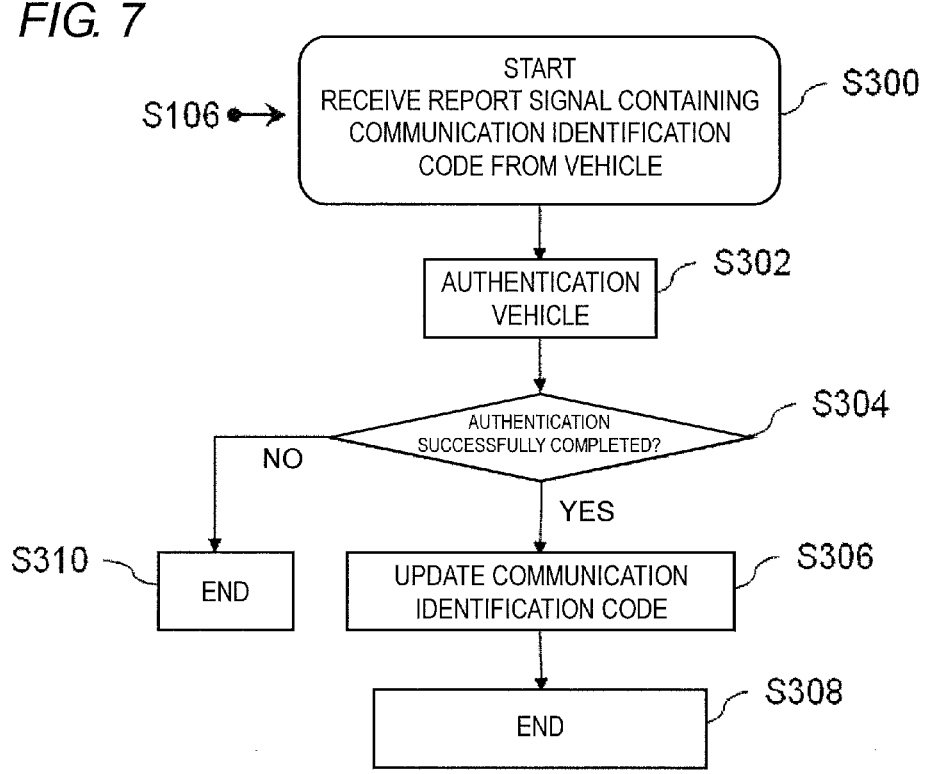
FIG. 7 is a flowchart of a process performed by an FOB when the user exits out of the vehicle, in the communication system according to the first embodiment of the present invention.

Next, a description will be given of a process performed by the portable machine 20 when the portable machine 20 receives the communication identification code, with reference to FIG. 7. At S300, the portable machine communication unit 21 of the portable machine 20 receives the communication identification code, which the vehicle communication unit 11 has transmitted to the portable machine 20 at S106. At S302, the portable machine 20 authenticates the vehicle 10 by determining whether or not the vehicle 10 is a vehicle related to the portable machine 20 itself. Specifically, the vehicle communication unit 11 transmits a signal containing authentication information and the like (for example, a unique identification code) to the portable machine communication unit 21, in order to establish communications with the portable machine communication unit 21. After the portable machine communication unit 21 receives the authentication information and the like, the portable machine communication unit 21 and the vehicle communication unit 11 perform an authentication process and the like in accordance with a predetermined protocol. When all the steps of the authentication process and the like are successfully completed, the portable machine 20 authenticates the vehicle 10, and the wireless communications are established therebetween.

At S304, the portable machine 20 determines whether or not the authentication process and the like have been successfully completed between the portable machine communication unit 21 and the vehicle communication unit 11 and the communications have been established therebetween. If it is determined that the authentication process and the like have been successfully completed, the processing proceeds to S306. At S306, the portable machine 20 substitutes the successfully received communication identification code for an already stored communication identification code, and stores it in the storage unit 22. Thus, every time the user exits out of the vehicle 10, a different communication identification code is stored in the portable machine 20 as a latest communication identification code.

Next, a description will be given of a process by which the portable terminal 30 receives the communication identification code, with reference to FIG. 6. At S200, the user activates a vehicle program installed in the portable terminal 30 while the portable machine 20 stores the latest communication identification code as described above. After being activated, at S202, the vehicle program attempts to establish communications with the portable machine 20, in order to request a communication identification code from the portable machine 20. By attempting to establish the communications upon activating the vehicle program in this way, the user can control the vehicle 10 by using the portable terminal 30 promptly and reliably.

Figure 8:
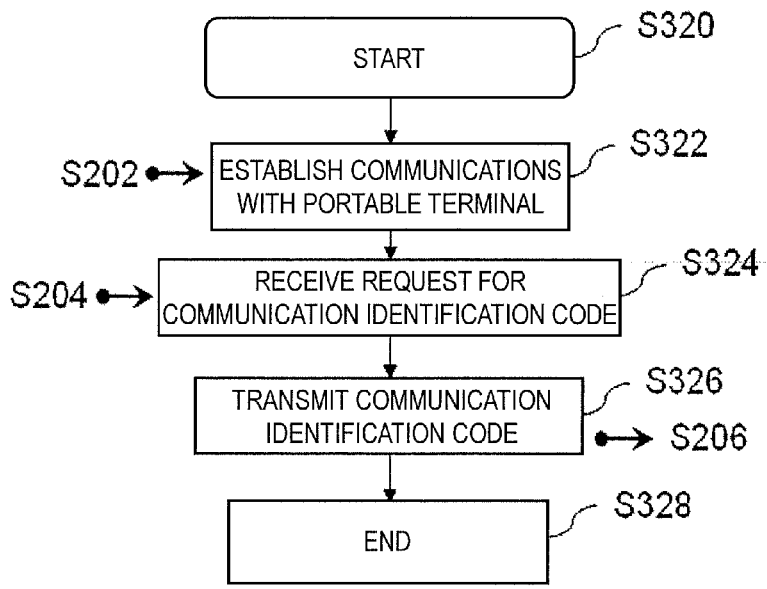
FIG. 8 is a flowchart of a process performed by the FOB when the FOB receives a request for a communication identification code from the portable terminal, in the communication system according to the first embodiment of the present invention.
Figure 18:
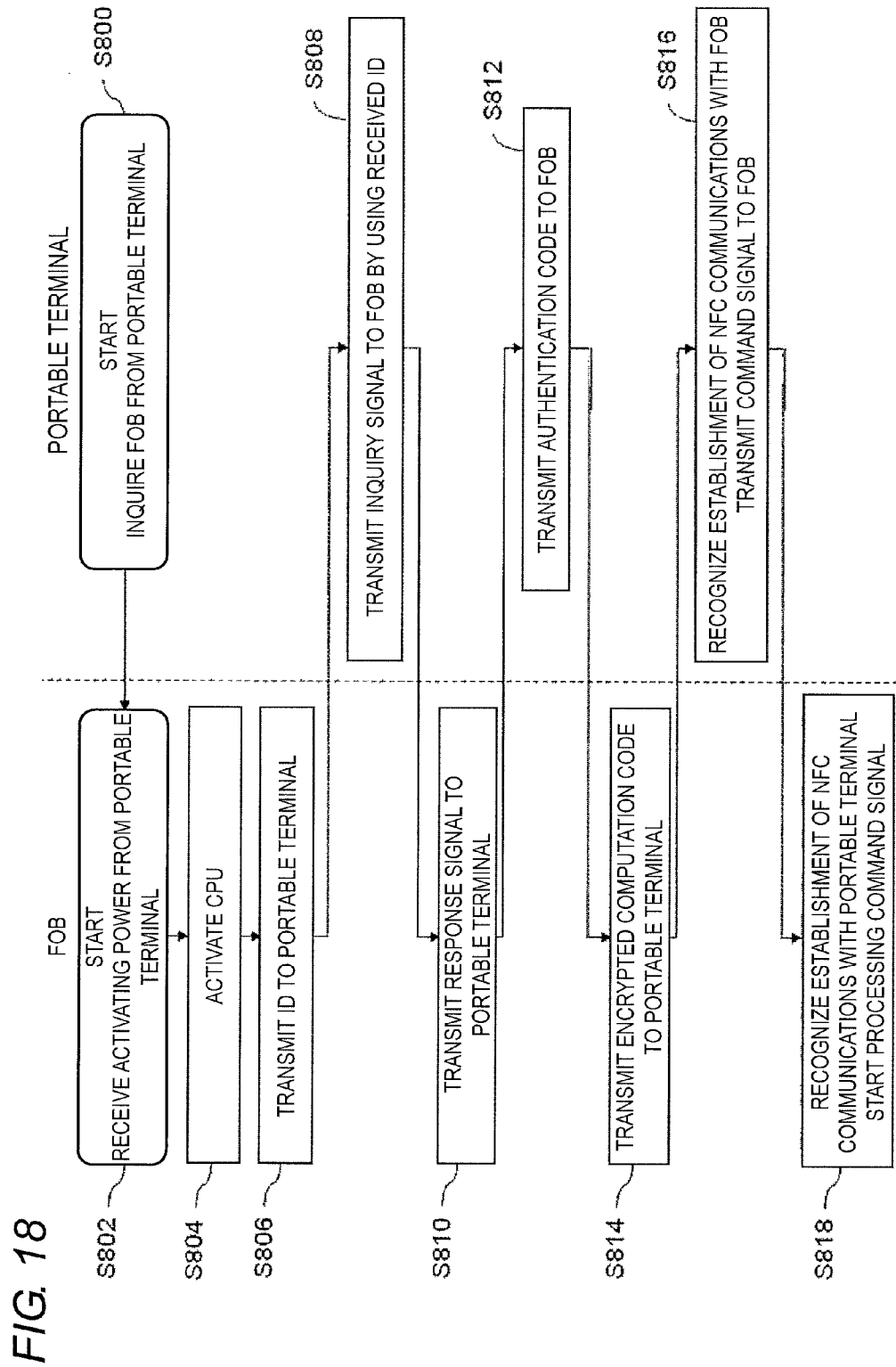
FIG. 18 is an explanatory view of a process of establishing NFC communications between the portable terminal and the FOB, in the communication system according to the first or second embodiment of the present invention.

FIG. 8 depicts a process performed by the portable machine 20 when the portable machine 20 receives the request for a communication identification code from the portable terminal 30. At S202, the portable machine 20 that has been requested to establish communications from the portable terminal 30 establishes the communications in accordance with a predetermined protocol. It should be noted that the predetermined protocol differs depending on which of NFC communications and Bluetooth communications are employed. Therefore, the detail of this process is depicted in FIGS. 18 and 19, but the detailed description thereof is omitted.

Figure 6:
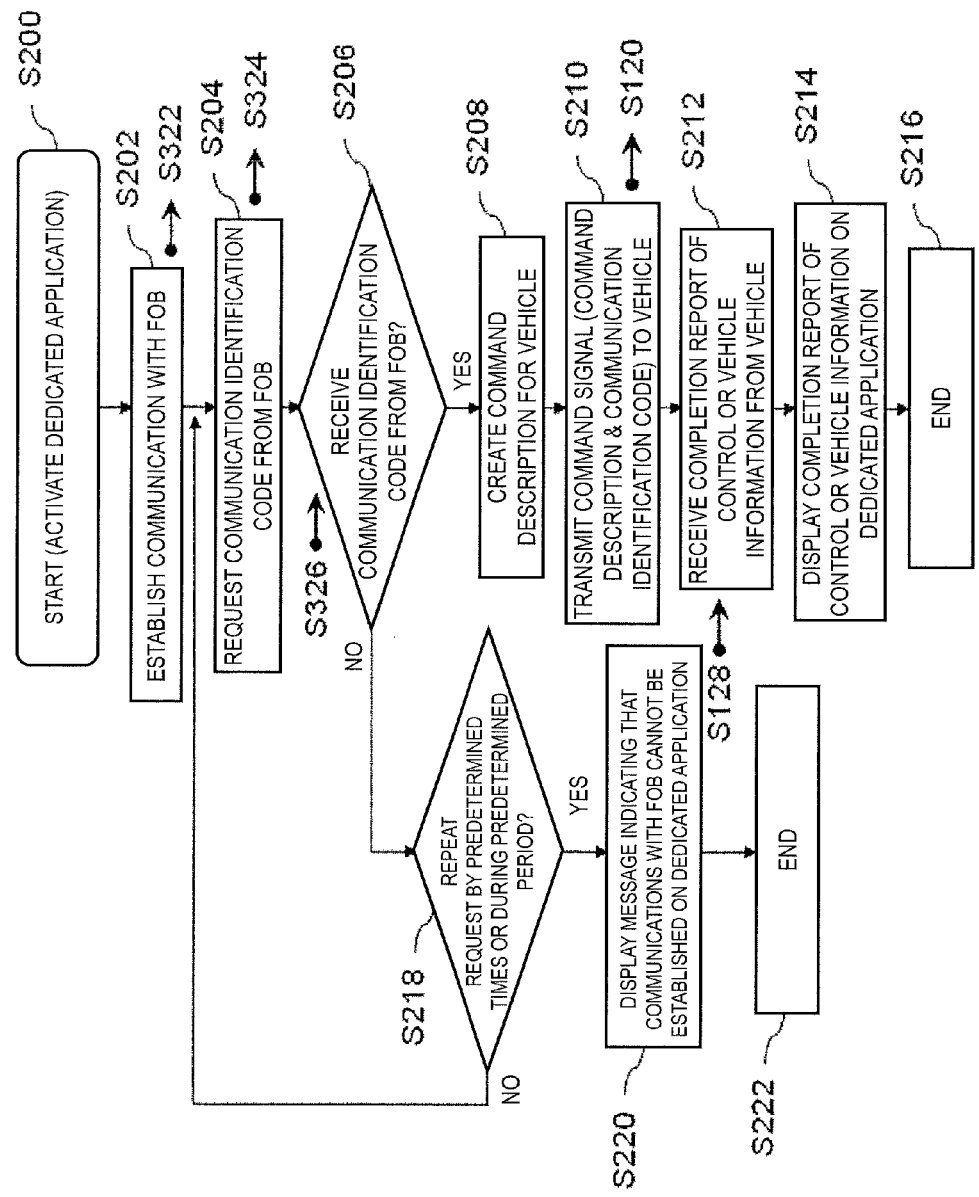
FIG. 6 is a flowchart of a process performed by the portable terminal, in the communication system according to the first embodiment of the present invention.

After the communications are established between the portable machine 20 and the portable terminal 30, the portable terminal 30 requests the portable machine 20 to transmit the communication identification code at S204 of FIG. 6. Therefore, at S324 of FIG. 8, the portable machine 20 receives the request for a communication identification code from the portable terminal 30. In response to the request, at S326, the portable machine 20 transmits, to the portable terminal 30, the communication identification code stored in the storage unit 22.

At S206 of FIG. 6, the vehicle program in the portable terminal 30 determines whether or not the portable terminal 30 has received the communication identification code from the portable machine 20. If it is determined that the communication identification code has been received, the vehicle program creates a control description for the vehicle 10 or an instruction therefor, based on a user's operation (for example, the lock of a door, the start of an engine, the acquisition of vehicle information, etc.) at S208.

At S210, the portable terminal 30 transmits, to the vehicle 10, a command signal that contains the control description or instruction having been created at S208 and the communication identification code having been received at S206. After transmitting the command signal, the vehicle program may delete the communication identification code, or hold it under the suitable management, for the purpose of another subsequent control or the like.

Figure 5:
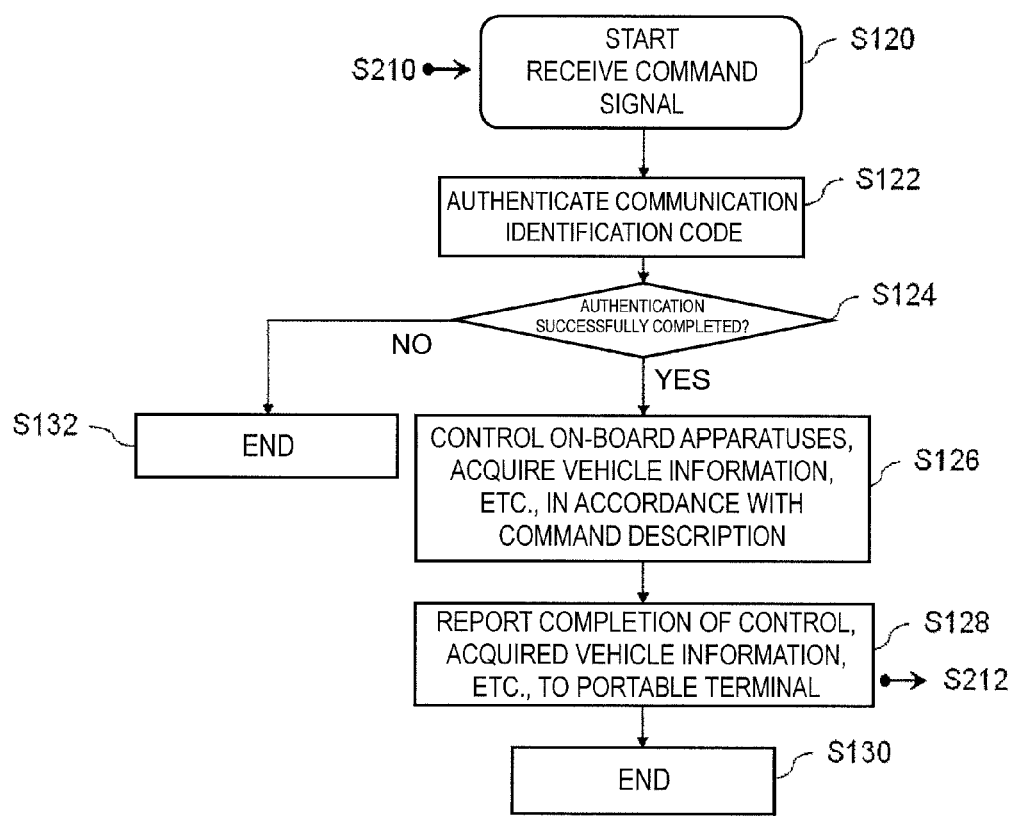
FIG. 5 is a flowchart of a process performed by the vehicle when the vehicle receives an instruction signal from a portable terminal, in the communication system according to the first embodiment of the present invention.

FIG. 5 depicts a process performed by the vehicle 10 when the vehicle 10 receives the command signal from the portable terminal 30. At S120, the vehicle communication unit 11 of the vehicle 10 receives the command signal that the portable terminal 30 has transmitted at S210, and forwards it to the authentication unit 13. At S122, the authentication unit 13 of the vehicle 10 authenticates the communication identification code contained in the received command signal. At S124, the authentication unit 13 determines whether or not the received communication identification code matches a latest communication identification code that the communication identification code generation unit 12 has created by itself and that the communication identification code storage unit stores. With this process, the control and instruction from a proper portable terminal are eliminated, thereby ensuring a high level of security. When the communication identification code contains the timestamp information regarding the generation time, if a valid period (for example, 10 days) of the communication identification code set in advance has already expired, the authentication unit 13 may not authenticate the communication identification code. Through this process, the communication identification code after a lapse of a predetermined time or longer since the generation thereof can be made invalid, thereby enhancing the security.

It is determined that the received communication identification code matches the latest communication identification code at S124, at S126, the authentication unit 13 forwards the control description, instruction, or the like contained in the command signal having been received at S120 to the vehicle control unit 14. The vehicle control unit 14, for example, controls on-board apparatuses or acquires vehicle information, in accordance with the control description, instruction, or the like. Finally, at S128, the vehicle control unit 14 transmits the control result, acquired vehicle information, or the like to the portable terminal 30 through the vehicle communication unit 11. Otherwise, when it is determined that the received communication identification code does not match the latest communication identification code at S124, the authentication unit 13 determines that the received communication identification code is not transmitted from a proper portable terminal, and the vehicle 10 does not perform any process.

At S212 of FIG. 6, the vehicle program in the portable terminal 30 receives the control result, acquired vehicle information, or the like that the vehicle 10 has transmitted at S128, and the portable terminal 30 displays the control result or the like toward the user at S214. Otherwise, when the vehicle program has not received the communication identification code from the portable machine 20 at S206, the portable terminal 30 repeats the request for the communication identification code from the portable machine 20 by predetermined times or during a predetermined period at S218. Nevertheless, if being unable to acquire the communication identification code, the vehicle program in the portable terminal 30 displays, toward the user, a message indicating that, for example, communications with the portable machine 20 cannot be established, or the communication identification code cannot be acquired, at S220.

[Modification of First Embodiment]

Figure 9:
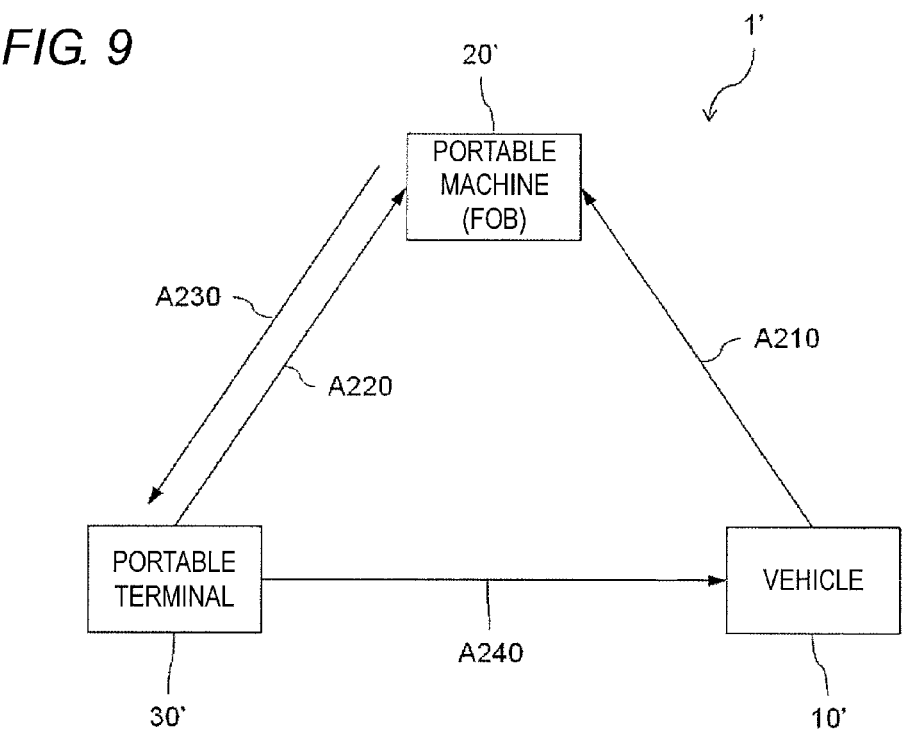
FIG. 9 is an explanatory view of an outline of communications among three nodes in a modification of the communication system according to a modification of the first embodiment of the present invention.

FIG. 9 is an explanatory view of an outline of communications among three nodes in a communication system 1' according to a modification of the first embodiment. The communication system 1 generates a communication identification code that differs every time, whereas the communication system 1' generates a one-time public key that differs every time. A description will be given of an outline of communications among respective three nodes composed of a vehicle 10', a portable machine 20', and a portable terminal 30' in the communication system 1', with reference to FIG. 9. However, a description of part of the communication system 1' which overlaps the communication system 1 of FIG. 2 will be omitted as appropriate.

When any given event occurs in the vehicle 10', the vehicle 10' generates a new public key for the portable terminal 30'. In order to ensure highly secure communications between the portable terminal 30' and the vehicle 10', the public key serving as a key with which the vehicle 10' authenticates the portable terminal 30' may be frequently updated. However, the public key is not limited to a one-time one, but may be any other type of public key as long as it can ensure a sufficient security.

The vehicle 10' transmits the generated new public key to the portable machine 20', and the portable machine 20' receives this public key (A210). After receiving the public key, the portable machine 20' holds it by itself. While the portable machine 20' is holding the public key, when short-distance wireless communications are available between the portable machine 20' and the portable terminal 30', the portable terminal 30' inquires a public key of the portable machine 20', for example, at timing when a vehicle program is activated (A220).

Upon receiving the inquiry, the portable machine 20' transmits the held public key to the portable terminal 30' through the short-distance wireless communications, and the portable terminal 30' receives this public key (A230). The portable terminal 30' transmits, to the vehicle 10', a command signal that contains a control description encrypted by the received public key, and the vehicle 10' receives this command signal (A240). The vehicle 10' decodes the received, encrypted control description with a secret key that the vehicle 10' has. When the encrypted control description is successfully decoded, the vehicle 10' performs a control operation, based on the received control description. By encrypting the control description with the public key that differs every time, as described above, the security can be enhanced.

Moreover, if a predetermine period (for example, 48 hours, 10 days, etc.) or longer has lasted since the occurrence of an event, such as the user's exit, the vehicle 10' may update the public key by re-generating it. In this case, when the public key information is not updated in the portable machine 20' during a predetermined period, the portable machine 20' cannot communicate with the vehicle 10', thus enhancing the security.

[Second Embodiment]

Figure 10:
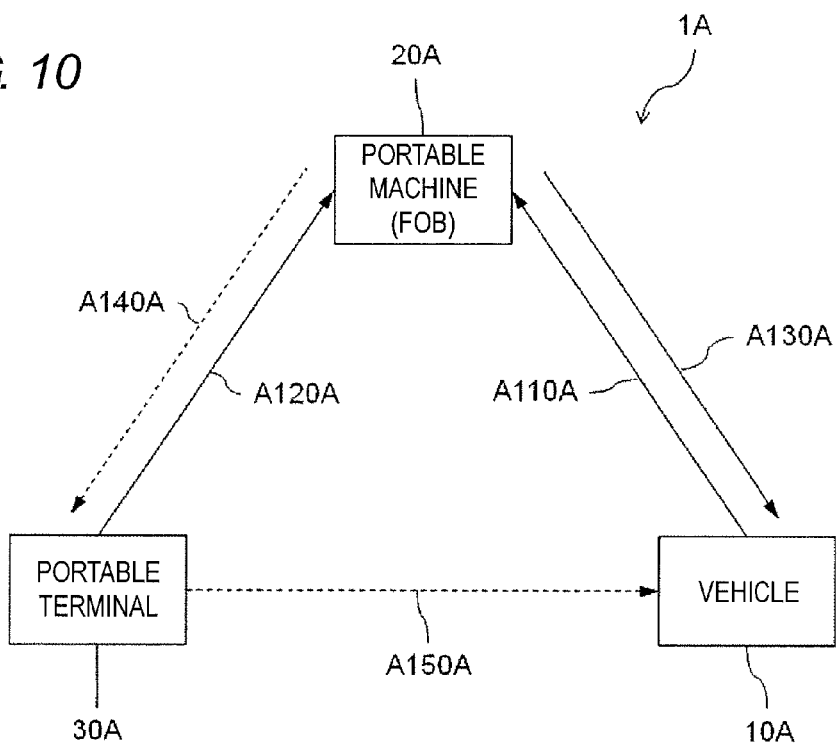
FIG. 10 is an explanatory view of an outline of communications among three nodes in a communication system according to a second embodiment of the present invention.

FIG. 10 is an explanatory view of an outline of communications among three nodes in a communication system 1A according to a second embodiment of the present invention. A description will be given of an outline of communications among respective three nodes composed of a vehicle 10A, a portable machine 20A, and a portable terminal 30A in the communication system 1A of this embodiment, with reference to FIG. 10. However, a description of part of the communication system 1A which overlaps the communication system 1 of FIG. 2 will be omitted as appropriate.

When any given event occurs in the vehicle 10A, the vehicle 10A generates a new communication identification code for the portable terminal 30A, similar to the first embodiment. Then, the vehicle 10A transmits the generated new communication identification code to the portable machine 20A, and the portable machine 20A receives this communication identification code (A110A). Then, the portable machine 20A holds the received communication identification code by itself.

While the portable machine 20A is holding the communication identification code, when short-distance wireless communications are available between the portable machine 20A and the portable terminal 30A, a user activates a vehicle program in the portable terminal 30A. Following this, the vehicle program transmits a command signal containing a control description and the like to the portable machine 20A, in order to control the vehicle 10A or acquire information therefrom. In turn, the portable machine 20A receives the command signal (A120A).

Upon receiving the command signal from the portable terminal 30A, the portable machine 20A forwards the received command signal to the vehicle 10A. When communications are available between the portable machine 20A and the vehicle 10A, the vehicle 10A receives the command signal (A130A). After receiving the command signal, the vehicle 10A performs an appropriate process, and transmits a control result, acquired vehicle information, or the like to the portable machine 20A in response to the command signal. In turn, the portable machine 20A forwards the control result or the like to the portable terminal 30A.

When the command signal is forwarded from the portable machine 20A to the vehicle 10A appropriately, as described above, the following process (indicated by dot-lines A140A and A150A in FIG. 10) is not performed. Meanwhile, for example, when communications are not available between the portable machine 20A and the vehicle 10A, the following process is performed. When the portable machine 20A transmits a command signal to the vehicle 10A but does not receive any response from the vehicle 10A, the portable machine 20A transmits, to the portable terminal 30A, a message signal indicating that, for example, wireless communications are not available between the portable machine 20A and the vehicle 10A or that communications with the vehicle 10A have failed. In turn, the portable terminal 30A receives this message signal (A140A).

Upon receiving the message signal indicating that, for example, communications with the vehicle 10A have failed, the portable terminal 30A determines that the portable machine 20A has not successfully communicated with the vehicle 10A. In this case, an acquisition unit 32A of the portable terminal 30A requests a communication identification code from the portable machine 20A, and acquires it. Then, the portable terminal 30A transmits, to the vehicle 10A, a command signal that contains the control description and the like having been transmitted at A120A, and the acquired communication identification code, and the vehicle 10A receives this command signal (A150A).

When the received communication identification code matches a most recent communication identification code stored in the communication identification code storage unit, the vehicle 10A performs a control operation based on the received control description. Basically, for example, when a user controls the vehicle 10A with the portable terminal 30A, the communications between the portable machine 20A and the vehicle 10A, which are highly secure, are conducted. Meanwhile, when communications are not available between the portable machine 20A and the vehicle 10A, the communications between the portable terminal 30A and the vehicle 10A are conducted through a telephone line or an internet connection. As a result, the user can, for example, control the vehicle 10A with the portable terminal 30A. It is obvious that even when the portable terminal 30A directly, for example, controls the vehicle 10A, the vehicle 10A authenticates the portable terminal 30A by using a communication identification code that differs every time, so that a high level of security is maintained.

Figure 11:
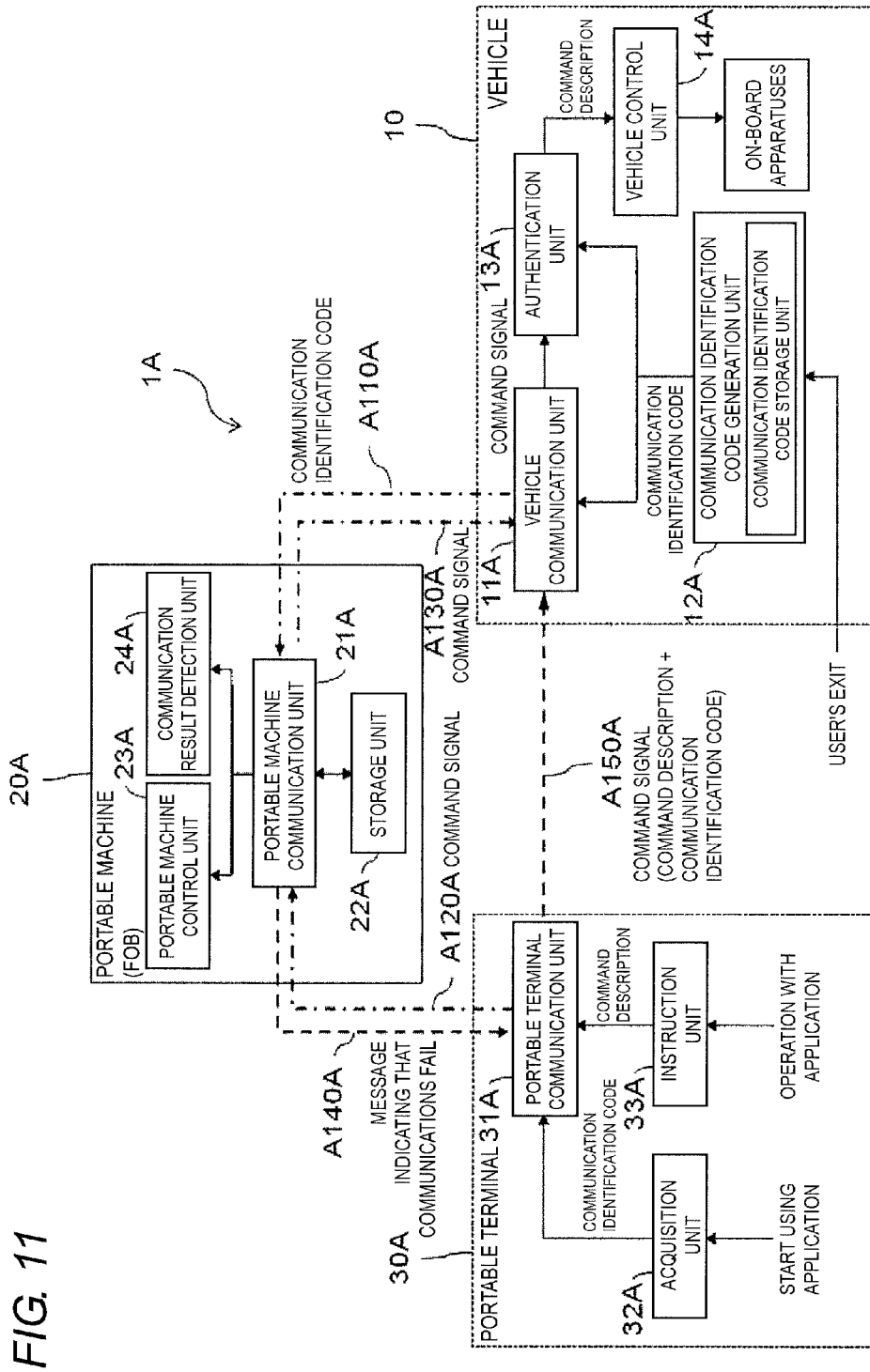
FIG. 11 is a block diagram of a functional configuration of the communication system according to the second embodiment of the present invention.

FIG. 11 depicts a functional configuration block of the communication system 1A of this embodiment. It should be noted that a description of part of the communication system 1A which overlaps the block diagram of the communication system 1 of the first embodiment in FIG. 3 will be omitted as appropriate. In the following description with reference to FIG. 11, timing when the user exits out of the vehicle 10A is also given as an example of the predetermined timing.

The communication system 1A includes the vehicle 10A, the portable machine 20A, and the portable terminal 30A. The vehicle 10A includes a vehicle communication unit 11A, a communication identification code generation unit 12A, an authentication unit 13A, and a vehicle control unit 14A. Specifically, the communication identification code generation unit 12A generates a communication identification code at predetermined timing. The communication identification code is necessary for the portable terminal 30A to control the vehicle 10A, and is generated so as to differ for every generation. The authentication unit 13A authenticates a signal containing a control description which the vehicle communication unit 11A receives from the portable terminal 30A. The vehicle control unit 14A controls the vehicle 10A, based on a control description acquired from the authentication unit 13A.

The portable terminal 30A includes a portable terminal communication unit 31A, the acquisition unit 32A, and an instruction unit 33A. Specifically, the portable terminal communication unit 31A conducts wireless communications with the vehicle communication unit 11A and the portable machine communication unit 21A. The acquisition unit 32A acquires a communication identification code stored in the storage unit 22A of the portable machine 20A through the portable machine communication unit 21A and the portable terminal communication unit 31A. The instruction unit 33A creates a control description for the vehicle 10A, and transmits a command signal containing the control description to the portable machine 20A through the portable terminal communication unit 31A. In addition, when the portable terminal communication unit 31A receives a communication identification code from the portable machine 20A, the instruction unit 33A transmits, to the vehicle communication unit 11A through the portable terminal communication unit 31A, a command signal that contains the control description and the received communication identification code.

The portable machine 20A includes a portable machine communication unit 21A, a storage unit 22A, a portable machine control unit 23A, and a communication result detection unit 24A. Specifically, the portable machine communication unit 21A has a unique identification code registered with the vehicle 10A, and conducts wireless communications with the vehicle communication unit 11A and short-distance wireless communications with the portable terminal communication unit 31A. The storage unit 22A stores a communication identification code that is generated by the communication identification code generation unit 12A and that is received through the vehicle communication unit 11A and the portable machine communication unit 21A. The portable machine control unit 23A controls communications between the portable machine 20A and the portable terminal 30A and between the portable machine 20A and the vehicle 10A. The communication result detection unit 24A detects that the portable machine communication unit 21A has successfully conducted wireless communications with the vehicle communication unit 11A.

Once the vehicle 10A detects a user's exit, the communication identification code generation unit 12A creates a communication identification code that is necessary for the portable terminal 30A to control the vehicle 10A and that differs from those have been generated before.

The communication identification code generation unit 12A stores the generated communication identification code in the communication identification code storage unit, and then forwards it to the vehicle communication unit 11A. The vehicle communication unit 11A transmits the communication identification code to the portable machine communication unit 21A of the portable machine 20A. In turn, the portable machine communication unit 21A receives the communication identification code (A110A). After receiving the communication identification code, the portable machine 20A stores it in the storage unit 22A.

A user activates a vehicle program in the portable terminal 30A, and instructs the control of the vehicle 10A or the acquisition of information therefrom by operating the vehicle program. In response, the instruction unit 33A creates a control description, based on the user's operation. When short-distance wireless communications are available between the portable machine 20A and the portable terminal 30A, the portable terminal 30A transmits a command signal containing the control description and the like to the portable machine 20A, in order to control the vehicle 10A or acquire information therefrom. In turn, the portable machine 20A receives this command signal (A120A).

After the portable machine communication unit 21A receives the command signal, when wireless communications are available between the portable machine 20A and the vehicle 10A, the portable machine communication unit 21A transmits, to the vehicle communication unit 11A through the portable machine communication unit 21A, a command signal that contains the received control description and the identification code of the portable machine 20A (A130A). The communication result detection unit 24A detects that the portable machine communication unit 21A has successfully delivered the command signal to the vehicle communication unit 11A.

If the command signal has been successfully delivered, the vehicle communication unit 11A transmits the received command signal to the authentication unit 13A. When determining that the unique identification code of the portable machine 20A which is contained in the received command signal matches an identification code of a portable machine which is registered with the vehicle 10A, the authentication unit 13A transmits, to the vehicle control unit 14A, the control description contained in the command signal which has been received together with the identification code of the portable machine 30A.

Otherwise, if the command signal has not been successfully delivered, the communication result detection unit 24A transmits, to the portable terminal communication unit 31A, a message signal indicating that, for example, the communications have failed, through the portable machine communication unit 21A. In turn, the portable terminal communication unit 31A receives this message signal (A140A).

In response to the message signal, the vehicle program in the portable terminal 30A renders the acquisition unit 32A be operative. The acquisition unit 32A transmits a request signal for a communication identification code to the portable machine 20A, in order to acquire the communication identification code therefrom. Upon receiving the request signal for a communication identification code, the portable machine 20A extracts the communication identification code from the storage unit 22A, and then transmits the communication identification code to the portable terminal 30A. In turn, the portable terminal 30A receives this communication identification code.

The vehicle program transmits, to the vehicle communication unit 11A, the command signal that contains the control description and the like and the communication identification code acquired from the portable machine 20A, through the portable terminal communication unit 31A. In turn, the vehicle communication unit 11A receives this command signal (A150A).

After receiving the command signal, the vehicle communication unit 11A forwards it to the authentication unit 13A. When determining that the communication identification code contained in the received command signal matches a latest one of the communication identification codes which the communication identification code storage unit stores and which the communication identification code generation unit 12A has generated, the authentication unit 13A forwards, to the vehicle control unit 14A, the control description contained in the command signal that the vehicle communication unit 11A has received together with the communication identification code.

As for a modification of A140A, when the portable machine communication unit 21A has not successfully delivered the command signal to the vehicle communication unit 11A, the portable machine control unit 23A may extract the communication identification code stored in the storage unit 22A, and transmit it to the portable terminal communication unit 31A through the portable machine communication unit 21A. In this case, the portable terminal 30A can transmit, to the vehicle 10A, the command signal that contains the received communication identification code and the control description, without the operation of the acquisition unit 32A.

In the communication system 1A, basically, when a user, for example, controls the vehicle 10A with the portable terminal 30A, communications between the portable machine 20A and the vehicle 10A, which are highly secure, are conducted. However, in this communication system 1A, even when communications are not available between the portable machine 20A and the vehicle 10A, the user can, for example, control the vehicle 10A with the portable terminal 30A through communications between the portable terminal 30A and the vehicle 10A which are conducted using a telephone line or an internet connection. Therefore, even if the portable machine 30A cannot transmit a control description and the like to the vehicle 10A due to the failure of communications therebetween, the portable terminal 30A can transmit the same control description and the like to the controlled object. This configuration enables the user to transmit a control description and the like to the controlled object reliably.

The wireless communications between the portable terminal communication unit 31A and the vehicle communication unit 11A can be conducted through an internet connection or a telephone line, as described above. Therefore, the communications between the portable terminal 31A and the vehicle 10A may employ a suitable communication method in accordance with the state or environment of the communication area. There are some areas which radio waves for UHF or Wi-Fi do not reach but a telephone line is available in. Accordingly, an appropriate communication method can be utilized in accordance with the state or environment of the communication area.

As described above, even when the portable terminal 30A directly, for example, controls the vehicle 10A, the communication identification code that is necessary for the portable terminal 30A to control the vehicle 10A is also updated frequently, for example, when the user exits out of the vehicle 10A. In addition, the valid latest communication identification code is not left in the portable terminal 30A persistently. Therefore, highly secure communications are achieved between the portable terminal 30A and the vehicle 10A. Consequently, it is possible to conduct highly secure communications between the portable terminal 30A and the vehicle 10A with simple processing and without inconveniencing a user, regardless of whether or not the user changes his/her portable terminal.

A detailed description will be given of a process performed by the communication system 1A, with reference to FIGS. 12 to 17. It should be noted that part of the process which overlaps the process of the first embodiment will be omitted as appropriate.

Figure 12:
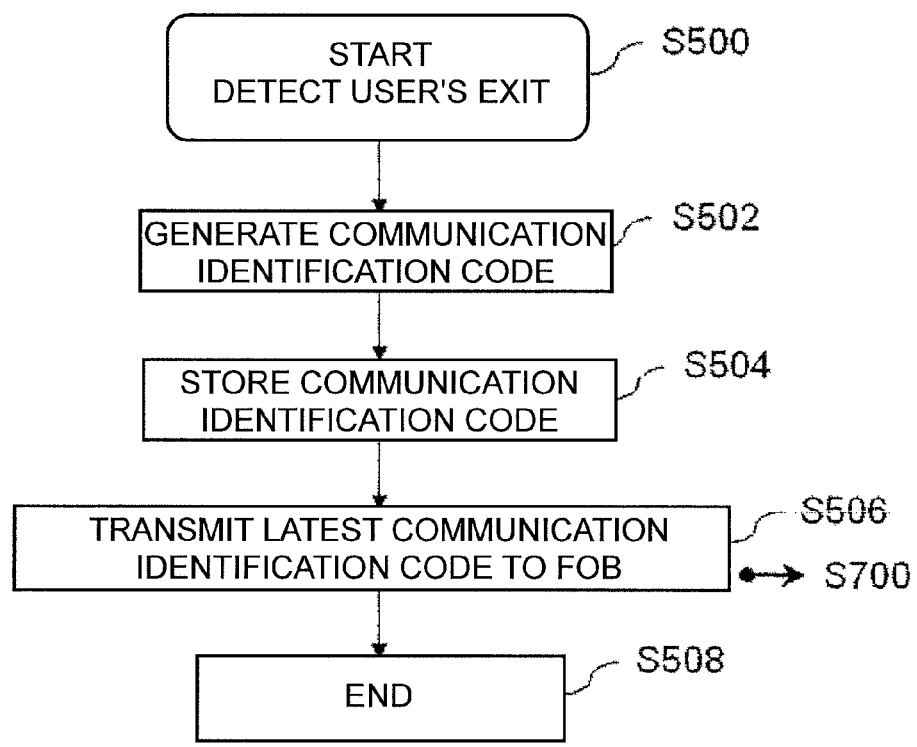
FIG. 12 is a flowchart of a process performed by the vehicle when a user exits out of a vehicle, in the communication system according to the second embodiment of the present invention.

FIG. 12 depicts a process performed by the vehicle 10A when the vehicle 10A detects a user's exit, in the communication system 1A of this embodiment. At S500, first, the vehicle 10A detects a user's exit.

At S502, upon receiving the result of sensing the user's exit, the communication identification code generation unit 12A generates a communication identification code. In this case, the generated communication identification code differs for every generation. At S504, the communication identification code storage unit stores the communication identification code generated by the communication identification code generation unit 12A, in order to compare this communication identification code with a communication identification code that would be transmitted from the portable terminal 30A in the future. At S506, the communication identification code is forwarded to the vehicle communication unit 11A, and the vehicle communication unit 11A transmits, to the portable machine 20A, the latest communication identification code that has been just generated, through wireless communications using LF or UHF radio waves. Accordingly, every time the user exits out of the vehicle 10A, a different communication identification code is transmitted to the portable machine 20A.

Figure 16:
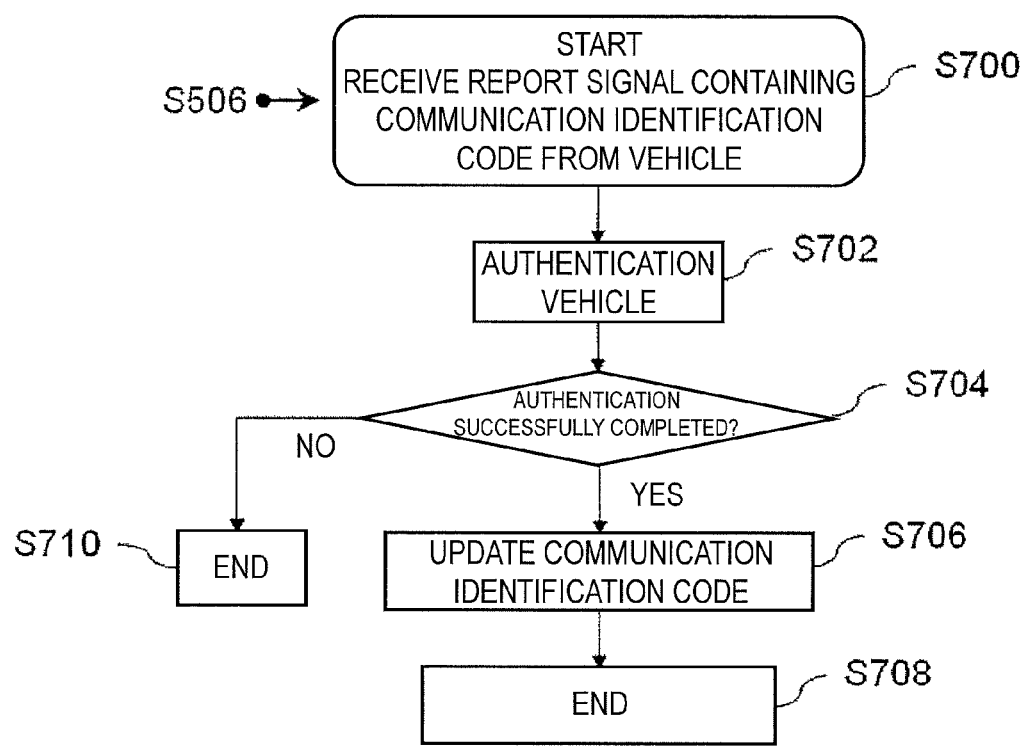
FIG. 16 is a flowchart of a process performed by the FOB when the user exits out of the vehicle in the communication system according to the second embodiment of the present invention.

Next, a description will be given of a process performed by the portable machine 20A when the portable machine 20A receives a communication identification code, with reference to FIG. 16. At S700, the portable machine communication unit 21A of the portable machine 20A receives the communication identification code, which the vehicle communication unit 11A has transmitted to the portable machine 20A at S506. At S702, the portable machine 20A authenticates the vehicle 10A by determining whether or not the vehicle 10A is a vehicle related to the portable machine 20A itself. Specifically, the vehicle communication unit 11A transmits a signal containing authentication information and the like (for example, a unique identification code) to the portable machine communication unit 21A, in order to establish communications with the portable machine communication unit 21A. After the portable machine communication unit 21A receives the authentication information and the like, the portable machine communication unit 21A and the vehicle communication unit 11A perform an authentication process and the like in accordance with a predetermined protocol. When all the steps of the authentication process and the like are successfully completed, the portable machine 20A authenticates the vehicle 10A, and the wireless communications are established therebetween.

At S704, the portable machine 20A determines whether or not the authentication has been successfully completed between the portable machine communication unit 21A and the vehicle communication unit 11A and the communications have been established therebetween. If it is determined that the authentication has been successfully completed, the processing proceeds to S706. At S706, the portable machine 30A substitutes the successfully received communication identification code for an already stored communication identification code, and stores it in the storage unit 22A. Thus, every time the user exits out of the vehicle 10A, a different communication identification code is stored in the portable machine 20A as a latest communication identification code.

Figure 15:
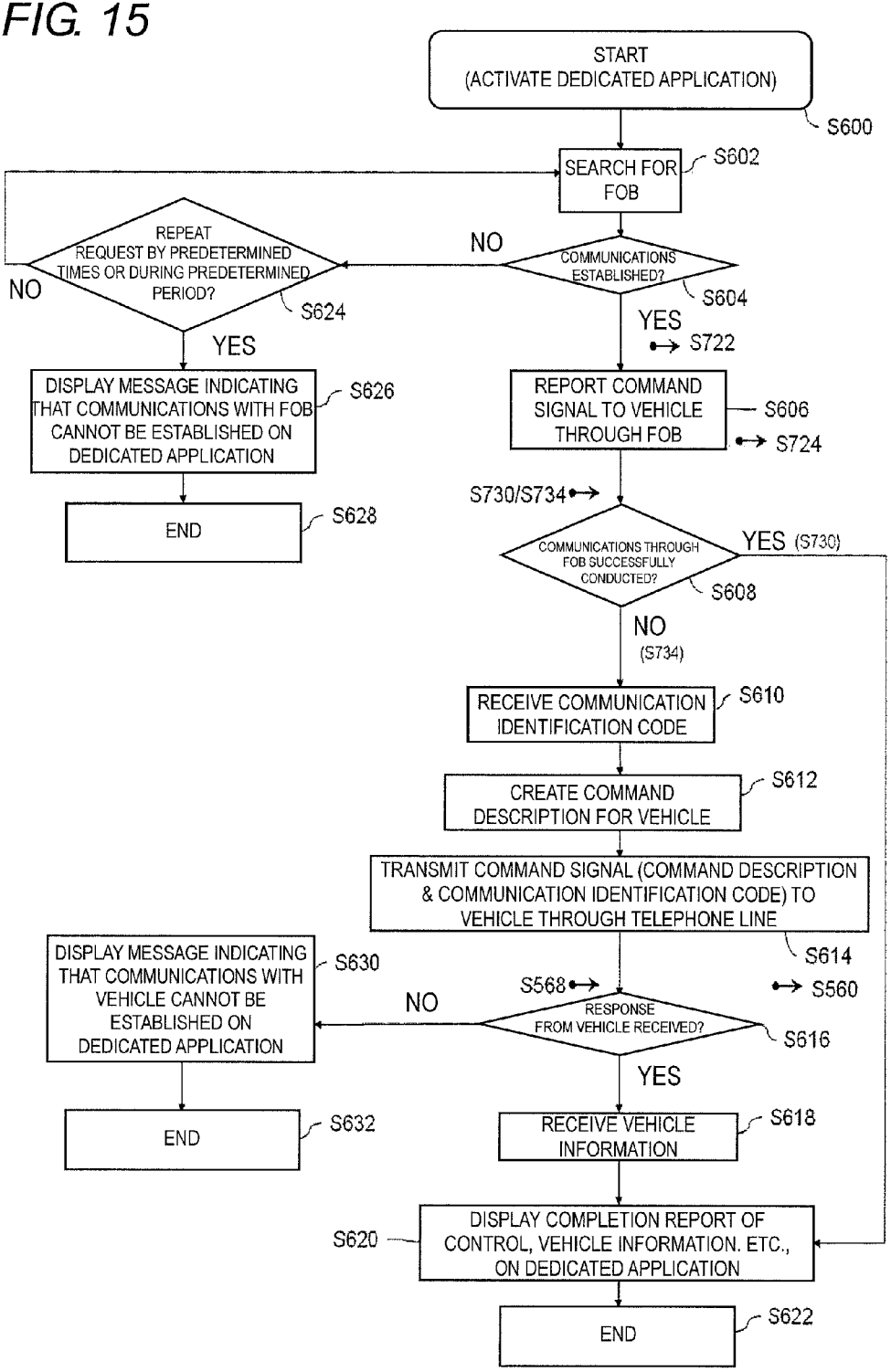
FIG. 15 is a flowchart of a process performed by the portable terminal, in the communication system according to the second embodiment of the present invention.

Next, a description will be given of a process performed by the portable terminal 30A in accordance with a user's operation for the vehicle 10A, with reference to FIG. 15. At S600, while the latest communication identification code is stored in the portable machine 20A as described above, a user activates a vehicle program installed in the portable terminal 30A. At S602, the vehicle program searches for the portable machine 20A in accordance with a predetermined protocol for short-distance wireless communications, such as NFC or Bluetooth.

Figure 17:
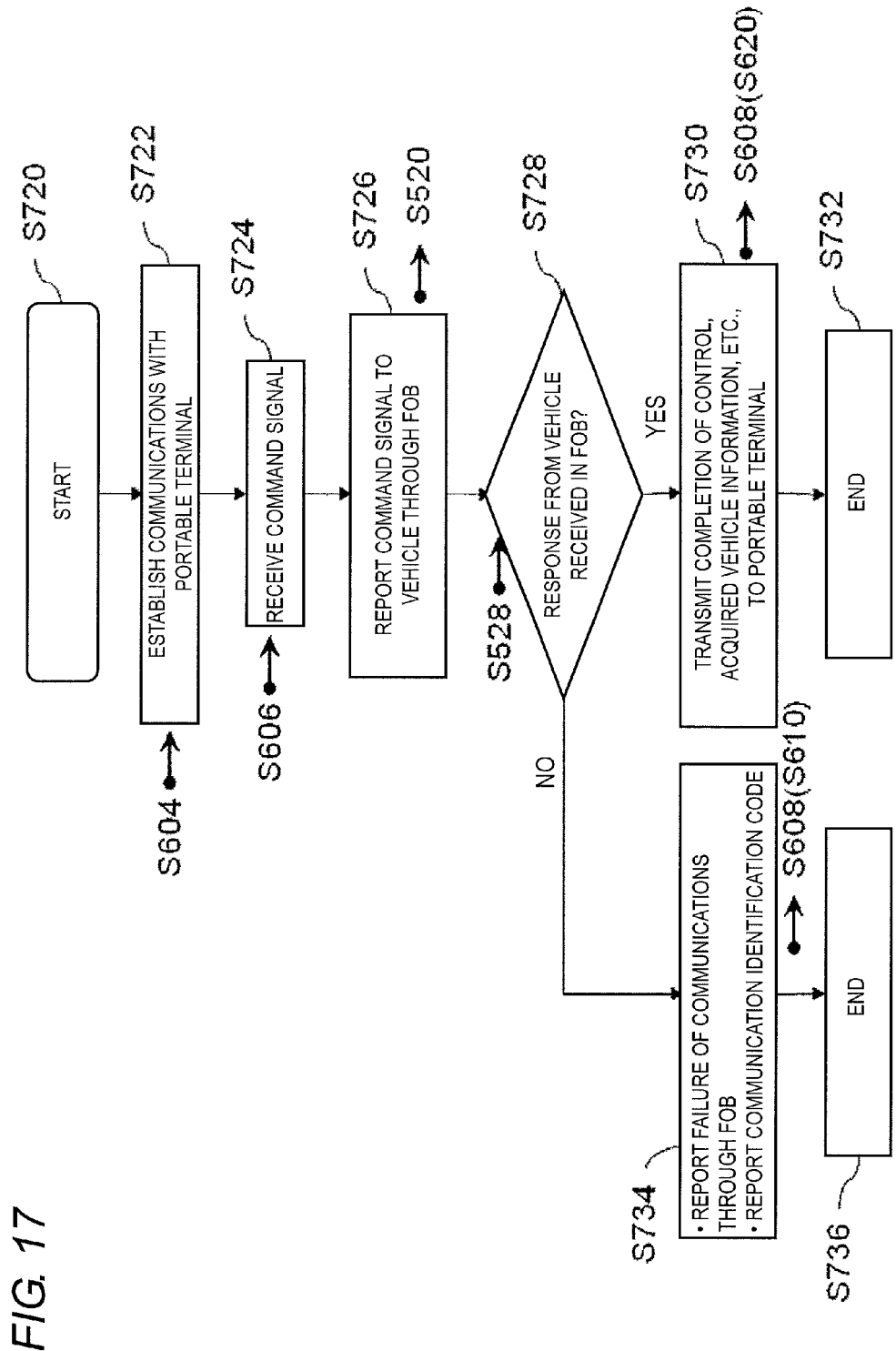
FIG. 17 is a flowchart of a process performed by the FOB when the FOB receives an instruction signal from the portable terminal, in the communication system according to the second embodiment of the present invention.

FIG. 17 depicts a process performed by the portable machine 20A when the portable machine 20A is searched for by the portable terminal 30A. At S722, when being requested to establish communications from the portable terminal 30A, the portable machine 20A establishes the communications in accordance with a predetermined protocol. At S604 of FIG. 15, the vehicle program confirms whether or not the portable terminal 30A has established the communications with the portable machine 20A, in order to communicate with the portable machine 20A. By attempting to establish the communications upon activating the vehicle program in the above manner, the user can control the vehicle 10A by using the portable terminal 30A promptly and reliably.

After activating the vehicle program in the portable terminal, the user operates the vehicle program in order to instruct the control of the vehicle 10A or the acquisition of information therefrom. After the communications are established between the portable machine 20A and the portable terminal 30A, at S606 of FIG. 15, the portable terminal 30A transmits, to the vehicle 10A, a command signal that contains a control description and the like that are based on the user's operation, through the portable machine 20A. In turn, at S724 of FIG. 17, the portable machine 20A receives the command signal from the portable terminal 30A. At S726, the portable machine 20A forwards the command signal to the vehicle 10A.

Figure 13:
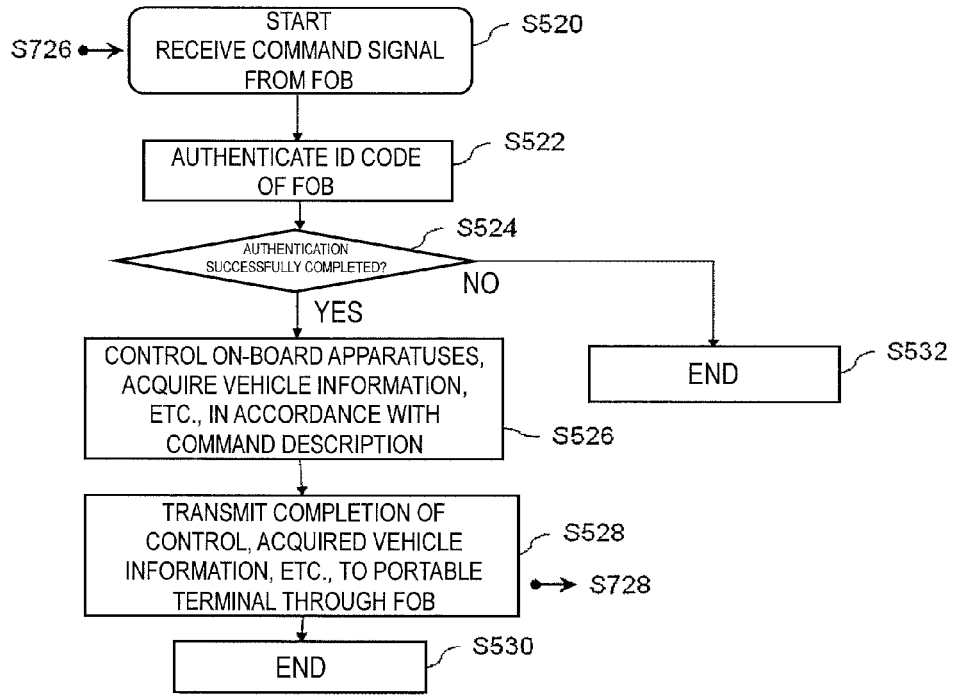
FIG. 13 is a flowchart of a process performed by the vehicle when the vehicle receives an instruction signal from a portable terminal through an FOB, in the communication system according to the second embodiment of the present invention.

Next, a description will be given of a process performed by the vehicle 10A when the vehicle 10A receives the command signal from the portable machine 20A through the portable machine 20A, with reference to FIG. 13. At S520, the vehicle 10A receives the command signal that the portable machine 20A has transmitted at S726. At S522, the vehicle 10A confirms whether or not the portable machine 20A which has transmitted the command signal is a portable machine related to the vehicle 10A itself, in accordance with a highly secure predetermined protocol between the vehicle 10A and the portable machine 20A. If it is confirmed, the vehicle 10A authenticates the portable machine 20A.

If having successfully authenticated the portable machine 20A, at S526, the vehicle 10A, for example, controls on-board apparatuses or acquires vehicle information therefrom, based on the user's command. At S528, the vehicle 10A transmits a completion report of the control, the acquired vehicle information, or the like to the portable terminal 30A through the portable machine 20A. After receiving the completion report of the control, if confirming a response from the vehicle 10A at S728 of FIG. 17, the portable machine 20A forwards the received completion report or the like to the portable terminal 30A at S730.

When receiving the completion report of the control or the like from the vehicle 10A through the portable machine 20A at S608, the vehicle program in the portable terminal 30A displays the received completion report of the control, the vehicle information, or the like on a screen of the portable terminal 30A, at S620.

Otherwise, if not confirming a response from the vehicle 10A at S728 of FIG. 17, at S734, the portable machine 20A transmits, to the portable terminal 30A, a message indicating that the command signal cannot be delivered to the vehicle 10A through the portable machine 30A due to the failure of communications between the portable machine 30A and the vehicle 10A, at S706. In addition, the portable machine 20A transmits thereto the communication identification code stored in the storage unit 22A of the portable machine 20A.

As a result, at S610, the portable terminal 30A receives the message indicating that the command signal cannot be delivered to the vehicle 10A, and the communication identification code. Receiving these message and code means that the portable terminal 30A cannot deliver the control description to the vehicle 10A through the portable machine 30A. Therefore, at S612, the portable terminal 30A creates, as a backup unit, a command signal that contains the received communication identification code, the control description, and the like, in order to directly deliver the control description and the like to the vehicle 10A. At S614, the portable terminal 30A transmits the created command signal to the vehicle 10A by using a telephone line.

Figure 14:
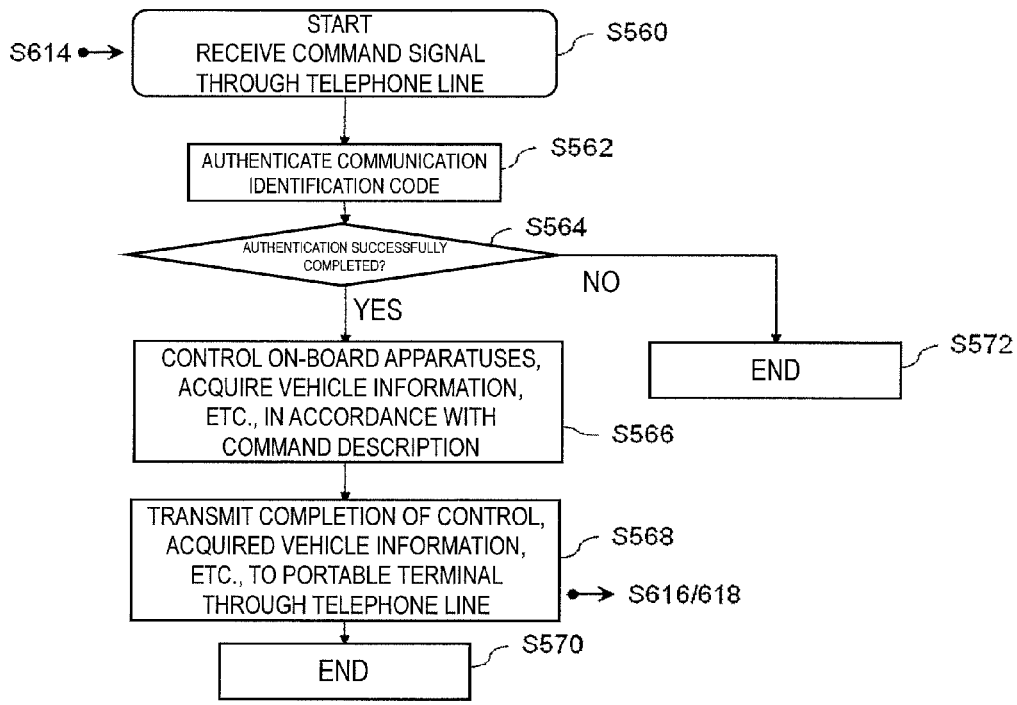
FIG. 14 is a flowchart of a process performed by the vehicle when the vehicle receives an instruction signal from the portable terminal without passing through the FOB, in the communication system according to the second embodiment of the present invention.

FIG. 14 depicts a process performed by the vehicle 10A when the vehicle 10A receives the command signal from the portable terminal 30A through the telephone line. At S560, the vehicle 10A receives the command signal that the portable terminal 30A has transmitted at S614, through the telephone line. At S562, the vehicle 10A attempts to authenticate the communication identification code contained in the received command signal. At S564, the vehicle 10A confirms whether or not the authentication has been successfully completed at S564, namely, whether or not the communication identification code matches the latest communication identification code stored in the communication identification code storage unit.

If the authentication has been successfully completed, the vehicle 10A, for example, controls on-board apparatuses or acquires vehicle information, in accordance with the control description or the like based on the user's operation, at S566. At S568, the vehicle 10A transmits, to the portable terminal 30A, a completion report of the control description, the acquired vehicle information, or the like, through the telephone line, in response to the command signal.

At S616, the portable terminal 30A confirms whether or not the above completion report or the like is to be delivered from the vehicle 10A. If there is any response from the vehicle A10, the portable terminal 30A receives the above completion report or the vehicle information at S618. At S620, the vehicle program in the portable terminal 30A displays the received completion report or vehicle information on a screen of the portable terminal 30A.

Otherwise, if there is no response from the vehicle A10, at S630, the vehicle program displays, on the screen, a message indicating that communications with the vehicle 10A cannot be established through any of the portable machine 20A and the telephone line. Meanwhile, if being unable to communicate with the portable machine 20A at S604, the vehicle program attempts to establish communications with the portable machine 20A by predetermined times or during a predetermined period at S624. Nevertheless, when the communications cannot be established, the vehicle program displays, toward the user, a message indicating that communications with the portable machine 30A cannot be established, at S626.

It should be noted that the present invention is not limited to the embodiments having been described, and configurations of the present invention may be contemplated without departing from the scopes described in the individual claims.

What is claimed is:

1. A communication system comprising:
    an object communication unit provided in a controlled object;
    a portable machine having an identification code registered in the controlled object, the portable machine including a portable machine communication unit conducting wireless communications with the object communication unit; and
    a portable terminal including a portable terminal communication unit conducting wireless communications with the object communication unit and the portable machine communication unit,
    the controlled object further including:
    a communication identification code generation unit generating a communication identification code at predetermined timing, the communication identification code being necessary for the portable terminal to control the controlled object, the communication identification code differing for every generation;
    an authentication unit authenticating a signal containing a control description which the object communication unit receives from the portable terminal communication unit; and
    an object control unit controlling the controlled object, based on the control description acquired from the authentication unit,
    the portable machine further including a storage unit storing the communication identification code, the communication identification code being generated by the communication identification code generation unit and being received through the object communication unit and the portable machine communication unit,
    the portable terminal further including:
    an acquisition unit acquiring the communication identification code stored in the storage unit of the portable machine through the portable machine communication unit and the portable terminal communication unit; and
    an instruction unit generating the control description for the controlled object, the instruction unit transmitting a signal containing the control description and the communication identification code acquired by the acquisition unit to the object communication unit from the portable terminal communication unit,
    wherein when the authentication unit determines that the communication identification code contained in the signal which the object communication unit has received matches a latest communication identification code which the communication identification code generation unit has generated, the authentication unit forwards, to the object control unit, the control description contained in the signal which the object communication unit has received together with the communication identification code.

2. The communication system according to claim 1, wherein in the portable terminal, the acquisition unit acquires the communication identification code, at the time when an application for controlling the controlled object is activated.

3. The communication system according to claim 1, wherein the communication identification code contains timestamp information regarding a generation time of the communication identification code, and the authentication unit determines the authentication, based on the timestamp information.

4. The communication system according to claim 3, wherein a public key is used as the communication identification code, and the control description is encrypted with the public key.

5. The communication system according to claim 1, wherein
    the controlled object is a vehicle,
    the predetermined timing is a time when a door of the vehicle is locked, and
    at the time when the door of the vehicle is locked, the communication identification code generation unit generates the communication identification code, and transmits the communication identification code to the portable machine communication unit through the object communication unit.

6. The communication system according to claim 1, wherein the communication identification code generation unit generates the communication identification code having been generated at the predetermined timing, and transmits the communication identification code to the portable machine communication unit through the object communication unit.

7. The communication system according to claim 1, wherein the portable machine further includes:
    a portable machine control unit controlling wireless communications between the portable machine communication unit and the object communication unit and between the portable machine communication unit and the portable terminal communication unit; and
    a communication result detection unit detecting that the portable machine communication unit has successfully conducted wireless communications with the object communication unit, and
    wherein the portable terminal transmits the control description generated by the instruction unit to the portable machine communication unit from the portable terminal communication unit,
    the portable machine control unit conducts communications to transmit a signal containing the control description received by the portable machine communication unit and the identification code to the object communication unit from the portable machine communication unit,
    the communication result detection unit detects a result of the communications, and transmits a message indicating that the communications have failed to the portable terminal communication unit from the portable machine communication unit when the communications fail, and
    upon receiving the message indicating that the communications have failed, the instruction unit of the portable terminal transmits a signal containing the control description and the communication identification code acquired by the acquisition unit to the object communication unit through the portable terminal communication unit.

8. The communication system according to claim 1, wherein the wireless communications between the portable terminal communication unit and the object communication unit are conducted through an internet connection.

9. The communication system according to claim 1, wherein the wireless communications between the portable terminal communication unit and the object communication unit are conducted through a telephone line.

10. The communication system according to claim 2, wherein the communication identification code contains timestamp information regarding a generation time of the communication identification code, and the authentication unit determines the authentication, based on the timestamp information.

11. The communication system according to claim 2, wherein
the controlled object is a vehicle,
the predetermined timing is a time when a door of the vehicle is locked, and
at the time when the door of the vehicle is locked, the communication identification code generation unit generates the communication identification code, and transmits the communication identification code to the portable machine communication unit through the object communication unit.

12. The communication system according to claim 3, wherein
the controlled object is a vehicle,
the predetermined timing is a time when a door of the vehicle is locked, and
at the time when the door of the vehicle is locked, the communication identification code generation unit generates the communication identification code, and transmits the communication identification code to the portable machine communication unit through the object communication unit.

13. The communication system according to claim 4, wherein
the controlled object is a vehicle,
the predetermined timing is a time when a door of the vehicle is locked, and
at the time when the door of the vehicle is locked, the communication identification code generation unit generates the communication identification code, and transmits the communication identification code to the portable machine communication unit through the object communication unit.

14. The communication system according to claim 2, wherein the communication identification code generation unit generates the communication identification code having been generated at the predetermined timing, and transmits the communication identification code to the portable machine communication unit through the object communication unit.

15. The communication system according to claim 3, wherein the communication identification code generation unit generates the communication identification code having been generated at the predetermined timing, and transmits the communication identification code to the portable machine communication unit through the object communication unit.

16. The communication system according to claim 4, wherein the communication identification code generation unit generates the communication identification code having been generated at the predetermined timing, and transmits the communication identification code to the portable machine communication unit through the object communication unit.

17. The communication system according to claim 5, wherein the communication identification code generation unit generates the communication identification code having been generated at the predetermined timing, and transmits the communication identification code to the portable machine communication unit through the object communication unit.

18. A portable machine having an identification code registered in a controlled object, the portable machine configured to conduct wireless communications with a portable terminal and the controlled object, the portable terminal creating a control description and transmitting the control description and a communication identification code to the controlled object through the wireless communications, the controlled object executing the control description when the communication identification code received from the portable terminal matches a latest communication identification code, the portable machine comprising:
a first portable machine communication unit receiving the communication identification code from the controlled object, the communication identification code being necessary for the portable terminal to control the controlled object, the communication identification code being generated by the controlled object at predetermined timing, the communication identification code differing for every generation;
a storage unit storing the communication identification code received by the first portable machine communication unit; and
a second portable machine communication unit transmitting the communication identification code stored in the storage unit to the portable terminal, in accordance with a request from the portable terminal.

19. A communication method performed among three parties including a controlled object, a portable machine having an identification code registered in the controlled object and conducting wireless communications with the controlled object, and a portable terminal conducting wireless communications with the controlled object and the portable machine, the communication method comprising:
generating a communication identification code at predetermined timing by using the controlled object, and then transmitting the communication identification code to the portable machine, the communication identification code being necessary for the portable terminal to control the controlled object, the communication identification code differing for every generation;
receiving, by using the portable machine, the communication identification code transmitted from the controlled object to store the communication identification code in the portable machine;
requesting, from the portable terminal, the portable machine to transmit the stored communication identification code;
transmitting, from the portable machine, the stored communication identification code to the portable terminal, in accordance with the request;
receiving, by using the portable terminal, the communication identification code transmitted from the portable machine;
transmitting, from the portable terminal, a created control description together with the received communication identification code to the controlled object; and
receiving, by using the controlled object, the communication identification code and the control description transmitted from the portable terminal, to cause the controlled object to perform a control operation in accordance with the received control description when the received communication identification code matches a latest communication identification code which the controlled object has generated.

* * * * *